United States Patent [19]

Dev et al.

[11] Patent Number: 4,932,026
[45] Date of Patent: Jun. 5, 1990

[54] APPARATUS FOR DISTRIBUTING DATA PROCESSING ACROSS A PLURALITY OF LOCI OF CONTROL

[75] Inventors: Roger H. Dev, Hudson, N.H.; Gabriel Steinberg, Watertown; John B. Kam, Concord, both of Mass.; Stewart A. Comer, Hollis, N.H.

[73] Assignee: Wang Laboratories, Inc., Lowell, Mass.

[21] Appl. No.: 944,500

[22] Filed: Dec. 19, 1986

[51] Int. Cl.⁵ .............................................. H04J 3/24
[52] U.S. Cl. .................................................. 370/94.1
[58] Field of Search ...................... 370/60, 94, 85, 88, 370/17, 13; 364/3, 133, 135

[56] References Cited

U.S. PATENT DOCUMENTS

| | | | |
|---|---|---|---|
| 4,503,499 | 3/1985 | Mason et al. | 364/200 |
| 4,679,189 | 7/1987 | Olson et al. | 370/94 |
| 4,750,109 | 6/1988 | Kita | 370/94 |

OTHER PUBLICATIONS

Which Computer, Mar. 1986, "Staffware".
Software Review, "Corporate Computing Catches Up With PCs", Kevin Townsend–Reprint from Computer Weekly, Feb. 13, 1986.
Seybold Report, vol. 8, No. 6, Jun. 3, 1985, "Routine Automation".
Fortune, Jun. 8, 1987, "Software Catches the Team Spirit" by Louis S. Richman, p. 125.
Logical Routing Specification in Office Information Systems, by Murray S. Mazer and Frederick H. Lochovsky in ACM Transactions in Office Information Systems, vol. 2, No. 4, Oct. 1984, pp. 303–330.
"An Active Mail System" by John Hogg, Stelios Gamvroulas Sigmod '84 Proceedings, Boston 1984.

Primary Examiner—Robert L. Griffin
Assistant Examiner—Wellington Chin
Attorney, Agent, or Firm—Michael H. Shanahan; Gordon E. Nelson

[57] ABSTRACT

Apparatus for distributing the processing of data across a plurality of loci of control which are connected by a mail system. The apparatus includes a package which contains files of various types and a route specifying the order in which the package is to be circulated among the loci and the processing to be done at each locus. Each locus includes programs executable by users which can manipulate the contents of the package. The programs automatically take the type of file being manipulated into account. The manipulations include modifying the unexecuted portion of the route. Each locus further includes a process which executes the route as modified, a process which tracks the package and receives control commands, and a process which handles errors detected by the other components or by users. The tracking processes maintain data bases for locating the package. When a user or the error handling process enters a control command at one locus, the tracking process at that locus uses the data bases to locate the package and send the control command to the locus currently processing the package. The route executing process checks with the tracking process and executes any control command before it sends the package to the next locus.

35 Claims, 10 Drawing Sheets

CONSTANTS 702

```
DEFINE SUCCESSFUL 1
DEFINE FAILURE 2
                                            COMMENT 705
GROUP init                       ! start a GROUP called init !
STATEMENT 607
! route to manager with return expected !
TO ORIGIONATOR'S MANAGER RETURNS manager-approval
IF manager-approval EQUAL FAILURE                ! check return !
      TO ORIGIONATOR         ( !action taken an manager approval failure !
      TERMINATE.              CREF 609
VREF 615    HREF 608
! route to finance representative with no return expected !
TO ORIGINATOR'S FINANCE REPRESENTATIVE
BACKUP RETURNS backup-status         ! perform backup !
CHECKPOINT          ! perform checkpoint without waiting for return !
END init            ! end GROUP named init !

GROUP act-pay       ! start a GROUP called act-pay !
TO ACCOUNTS PAYABLE           ! route to accounts payable !
      MBREF 611
! execute application ARCHIVE and wait for return !
EXECUTE ARCHIVE RETURNS store-status
IF store-status EQUAL SUCCESSFUL          !check return from ARCHIVE !
      TERMINATE
                  APPREF 614
ELSE
      ! send message to route administrator about ARCHIVE FAILURE !
      MESSAGE ""archive failed on form " ERA-FORM.FORM-ID " with a status
of " store-status" ACCOUNTS PAYABLE ROUTE ADMINISTRATOR
END act-pay         ! end GROUP named act-pay !              PREF 611

ERROR ANY init      ! error specification for GROUP init !
      MESSAGE ""form " ERA-FORM.FORM-ID " failed, please investigate"
CURRENT LOCATION'S ROUTE ADMINISTRATOR.

ERROR ANY act-pay           ! error specification for GROUP act-pay !
      MESSAGE ""form " ERA-FORM.FORM-ID " failed, please investigate"
.ACCOUNTS PAYABLE ROUTE ADMINISTRATOR.

AFTER 02/00/00 init    ! time limit specification for GROUP init !
      MESSAGE ""form " ERA-FORM.FORM-ID " is still in this system" "
ORIGIONATOR.
                              ROUTE 701
```

FIG. 7

APPARATUS FOR DISTRIBUTING DATA PROCESSING ACROSS A PLURALITY OF LOCI OF CONTROL

BACKGROUND OF THE INVENTION

1. Field of the Invention

The present invention relates to data processing systems and more particularly to data processing systems having a plurality of loci of control.

2. Description of the Prior Art

Many prior art computer systems have a plurality of loci of control, i.e., there is more than one entity in the computer system which may execute a program. The relationship between the loci of control and the system hardware varies from system to system. In some systems, a locus of control corresponds directly to a portion of a physical system. For example, in a distributed system connected by a network, each locus may be a node in the network. In others, the locus of control may be a task and one or more CPUs in a system may be multiplexed among a plurality of tasks.

Systems having a plurality of loci of control permit distributed data processing, i.e., data processing involving more than one locus of control. For example, a corporation may have a computer system consisting of a network with nodes at various branch offices, at regional offices, and the head office. The processing of expense reports for the corporation may involve processing in the branch offices, further processing at the regional offices, and still further processing at the head office.

The advantages of distributed data processing are obvious. It corresponds more closely to normal business procedures than centralized processing, the turn around time at each stage is quicker, and the fact that processing is carried on at many loci of control reduces the effect of the failure of any one of the loci. The use of distributed data processing has, however, been limited by the difficulties involved in programming for more than one locus. In programming for a single locus, a programmer need concern himself only with the sequence of operations to be performed; in programming for a plurality of loci, the programmer must write code for each of the loci and further specify communications between the loci. Even where the loci are tasks executing on a single system, the need to specify communications requires knowledge of the operating system not typically found among applications programmers. Where the loci are nodes in a network, the communications problem is more difficult. Moreover, in many cases, the nodes will have different kinds of processors, and consequently, writing a distributed application requires either a programmer who understands all of the processors or a group of programmers. Programmers of the former type are rare and expensive, and communication among a group of programmers is difficult, particularly when the programmers are programming different machines and may further be geographically dispersed. Prior art solutions to distributed processing have included systems in which processing is distributed among the loci but remains under central control and systems in which processing is under local control. An example of the first type of system is the active mail system described in John Hogg, Stelios Gamvroulas, "An Active Mail System", *SIGMOD* 1984 *Proceedings*, Boston, 1984, pp. 215-222.

The system described in the reference is an active mail system for processing messages. The messages are not merely passive text which is sent to recipients. Instead, a message is active and can perform functions such as receiving information from the recipient and providing it to the sender or using the information from the recipient to determine who the next recipient should be and directing itself to the next recipient. As may be seen at page 218 of the above reference, the embodiment of active mail described therein is implemented by means of a single central post office process which controls the messages at every point.

A commercial product which appears to embody the principles described in the above reference is Staffware, manufactured by FCMC, Inc., 2750 S. Wadsworth Blvd., Denver Colo. 80227. Staffware is described in the following publications:

Staffware Brochure and Demonstration Disk, FCMC, Inc., Denver, May, 1985.

"Routine Automation", *The Seybold Report on Office Systems*, vol. 8, no. 6, June 3, 1985, p. 18.

Kevin Townsend, "Corporate computing catches up with PCs", *Computer Weekly*, Feb. 13, 1986.

"Staffware", *Which Computer?*, March, 1986.

As described in the above publications, Staffware is a centralized system for automating business procedures where processing takes place at one or more locations accessible to the centralized system. Another product which appears to embody the same principles is the Workflo component of the Filenet document image processing system, manufactured by Filenet Corp., Costa Mesa, Calif.

An example of a system in which the distributed processing operates under local control is the office information routing system described in Murray S. Mazer, Frederick H. Lochovsky, "Logical Routing Specification in Office Information Systems", *ACM Transactions on Office Information Systems*, vol. 2, no. 4, Oct. 1984, pp. 303-330.

In that system, users define a routing specification for a type of message, for example a form for deciding whether a candidate is to be admitted to a Ph.D program. The routing specification describes how the message is to be routed among the loci, and can vary the routing depending on the values of fields in the message. Once the routing specification is finished, the portion of the specification relevant to a given locus is sent to that locus. When a message of the type corresponding to the routing specification arrives in the locus, it is processed as specified in that locus portion of the routing specification. The system also provides for override routing, in which the routing specification is edited for a given message, the altered specification is provided to the message, and further routing is as specified in the altered specification. The routing specification does not specify processing beyond routing.

A problem shared by both the centralized and distributed prior art systems is that the actual routing is done centrally. In the case of the active message systems, the recipient of the message cannot alter the processing of the message to suit his situation, and in the case of the Mazer Lochovsky system, the route specification is centrally defined and alterations may be made only by means of the override specification. The person making the override specification must have a cop of the route specification and must further know where the message presently is (Mazer and Lochovsky, pp 308-309). Overrides are consequently expensive and cannot be normal responses to the various situations encountered in the course of business procedures, but must be reserved for truly exceptional situations.

Centrally produced routing which is difficult to alter is further not well suited to business procedures. Definition of many business procedures is hierarchical, i.e., an upper level of management gives an overall definition of the procedure and management in the departments which actually carry out the procedure fill in the details. Moreover, each business transaction is in fact unique, and consequently, a distributed data processing system used for business transactions will be useful only if it is easy to modify the manner in which a specific transaction is dealt with.

A further problem shared by the prior art systems is that the message systems are limited to a single data type, namely the message, whereas many business procedures require information having a number of different types. For example, a business ordering transaction may involve an image of the customer letter which initiated the transfer, internal memos discussing the order, and a "form" (implemented by means of a spread sheet) for recording the data associated with the transaction. A truly useful system must not only provide data of such different types to the user, but must also make it easy for him to work with each type of data in the manner required by the type.

A further limitation of the prior art systems, finally, is that they are limited to interactive processing, i.e., they can present a message to a user for processing, but cannot apply the general resources of the locus to the message. Because this is the case, the prior art systems cannot be used for general distributed data processing.

A problem of the prior art systems in which the distributed processing is centrally controlled is the large amount of communication required between the central control and the loci where the remote processing is being done. Because of the large amount of communication, performance of such systems becomes unacceptable when the loci are connected by a wide area network.

A problem specific to the distributed systems, finally, is the tracking and control of the data as it is processed on the different loci. These, and other problems of the prior art are solved by the invention described herein.

SUMMARY OF THE INVENTION

The apparatus for distributing the processing of data across a plurality of loci of control of the present invention includes a package which contains the data to be processed and a processing descriptor which is associated with the data and specifies how the data is to be processed in more than one of the loci, a message system for providing the package to the loci, and an interpreter in each locus specified in the processing descriptor which processes the data as specified for that locus in the processing descriptor. Processing may be interactive or by means of program execution, with subsequent routing being dependent on the result of the processing.

In other aspects of the invention, the processing descriptor specifies the order in which the loci are to process the data, the interpreters return status data to a specified locus which records the status of the distributed processing, the association between a processing descriptor and the data may be determined by the type of the data, and the unexecuted portion of the processing descriptor may be altered in a locus.

It is thus an object of the invention to provide an improved digital data processing system;

It is another object of the invention to provide an improved digital data processing system of the type wherein processing is performed by a plurality of loci of control;

It is a further object of the invention to provide improved apparatus for distributing processing of data across a plurality of loci of control;

It is an additional object of the invention to provide apparatus which simplifies programming of distributed processing of data by a plurality of loci of control.

It is yet another object of the invention to provide apparatus for distributed data processing wherein the manner in which the processing takes place may be easily altered;

It is a still further object of the invention to provide apparatus for distributed data processing in which the data being processed may have a plurality of types.

Other objects and advantages of the present invention will be understood by those of ordinary skill in the art after referring to the detailed description of a preferred embodiment contained herein and to the drawings, wherein:

BRIEF DESCRIPTION OF DRAWINGS

FIG. 7 is an example route 315; and

Figure 1:
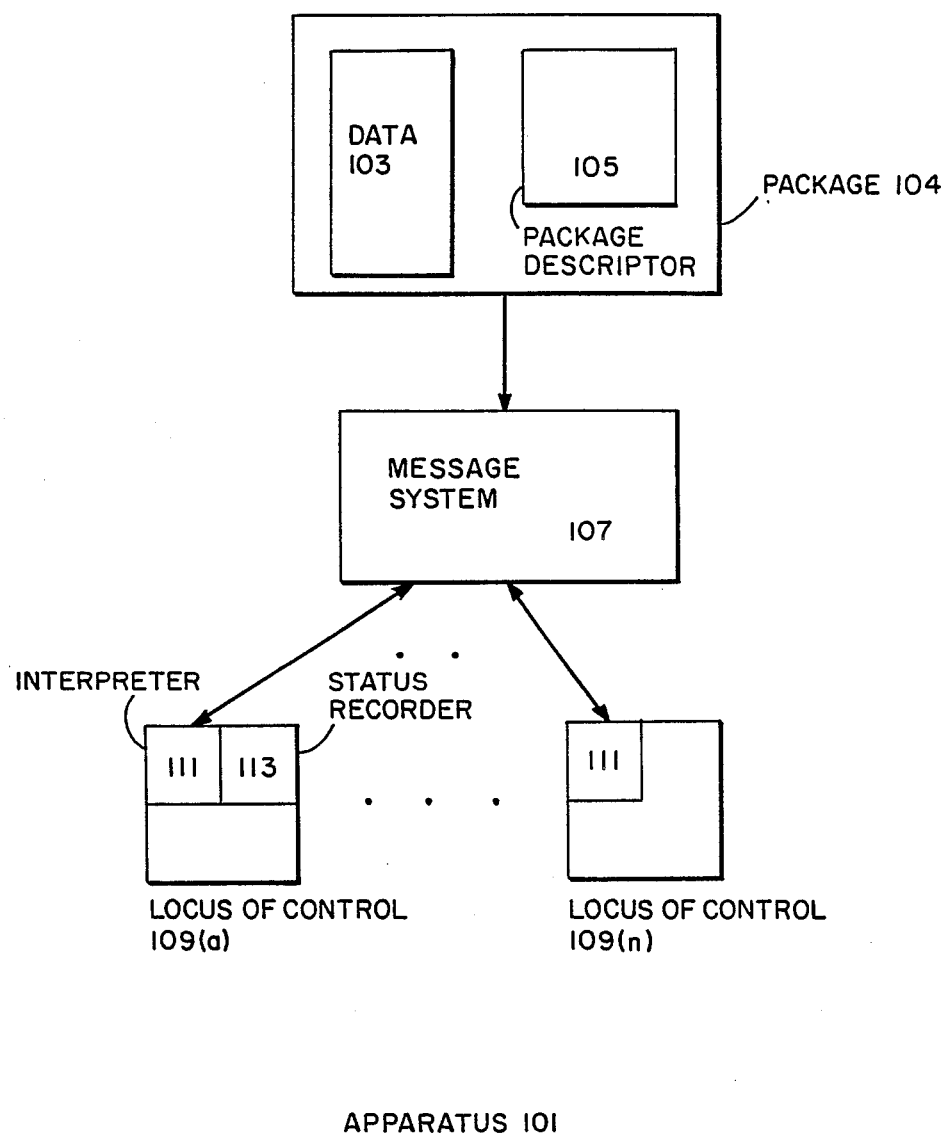
FIG. 1 is a logical overview of Apparatus 101 for Distributing Data Processing.

Reference numbers in the Figures have three or more digits. The two least significant digits are reference numbers within a drawing; the more significant digits are the drawing number. For example, the reference number 417 refers to item 17 first shown on drawing 4.

DESCRIPTION OF A PREFERRED EMBODIMENT

The following Description of a Preferred Embodiment begins with an overview of the logical structure and operation of the apparatus for distributing data processing of the present invention and continues with a detailed description of a preferred embodiment.

1. Logical Overview of the Apparatus for Distributing Data: FIG. 1

FIG. 1 is a logical block diagram of the apparatus for distributing data of the present invention. The apparatus is employed in a system including a plurality of loci of control (LC) 109(a . . . n) and a message system (MS) 107 for transferring data between the loci of control. The LCs 109 may be individual hardware processors in a multi processor system, nodes in a network, tasks in a multiprogramming system, or some combination of the above. If the LCs 109 are tasks, MS 107 may be an inter task communication system; if they are processors in a multi processor system, it may be a system for communicating between the processors; if they are nodes in a network, MS 107 may be the network. Again, combinations are possible. For example, if the LCs 109 are tasks running on nodes in the network, MS 107 may be inter task messages which are sent via the network.

The data to be processed in LCs 109 and the instructions for processing it are contained in package (PKG) 104. Data 103 may be in any form in which data may be transferred via MS 107. In many cases, data 103 will be a file or a set of several files. The instructions as to how data 103 is to be processed in the various LCs 109 are contained in processing descriptor (PD) 105. PD 105 may also be in any form in which data may be transferred via MS 107, and will in many cases be a file. The instructions indicate at least the sequence of steps to be executed in each LC 109, the maximum time intervals between the steps, and the actions to be taken when exception conditions occur. Additionally, execution of certain of the instructions may be dependent on values in data 103 and the instructions may further indicate which user of the system is responsible for data 103, so that information concerning the status of the processing may be returned to him.

Each LC 109 includes an interpreter (INT) 111 which reads PD 105 and causes LC 109 to carry out the instructions for that LC 109 contained in PD 105. If further processing at another LC 109 is required, INT 111 uses MS 107 to send package 104 to that LC 109. As LC 109 carries out the instructions, it may also report the status of the processing on that LC 109 by sending status messages via MS 107 concerning the status to another LC 109 specified in PD 105. The specified LC 109, shown in FIG. 1 as LC 109(a), further includes status recorder (SR) 113, which receives the status messages and records them for examination by the person controlling the process specified in PD 105.

Operation of apparatus 101 is as follows: Package 104 is created by a user of one of the LCs 109. PD 105 describes the order in which the LCs 109 involved in the process are to process data 103 in package 104 and the processing to be done in each LC 109. INT 111 in the LC 109 on which package 104 is created reads PD 105 and sends package 104 to the first LC 109 specified in PD 105. INT 111 in that LC 109 performs the processing specified for it in PD 105 and then sends package 104 to the next specified LC 109, and so forth until the processing is finished. Since PD 105 describes the order in which LCs 109 process data 103, a given LC 109 may deal with package 104 more than once in the course of the processing. Status information generated during processing is collected by SR 113 on one or more of the LCs 109.

An important aspect of apparatus 101 is that package 104 is managed exclusively by apparatus 101. A package 104 may only be created through apparatus 101. Depending on the kind of access a user of apparatus 101 has to package 104, a user may modify or delete part or all of data 103, copy data 103 out of package 104, copy data 103 into package 104, modify or delete PD 105, or add an additional PD 105, but he may do all of these things and may destroy PKG 104 only by means of apparatus 101. By this means, apparatus 101 guarantees that all processing required for a business process will take place within the controlled environment of apparatus 101.

Figure 2:
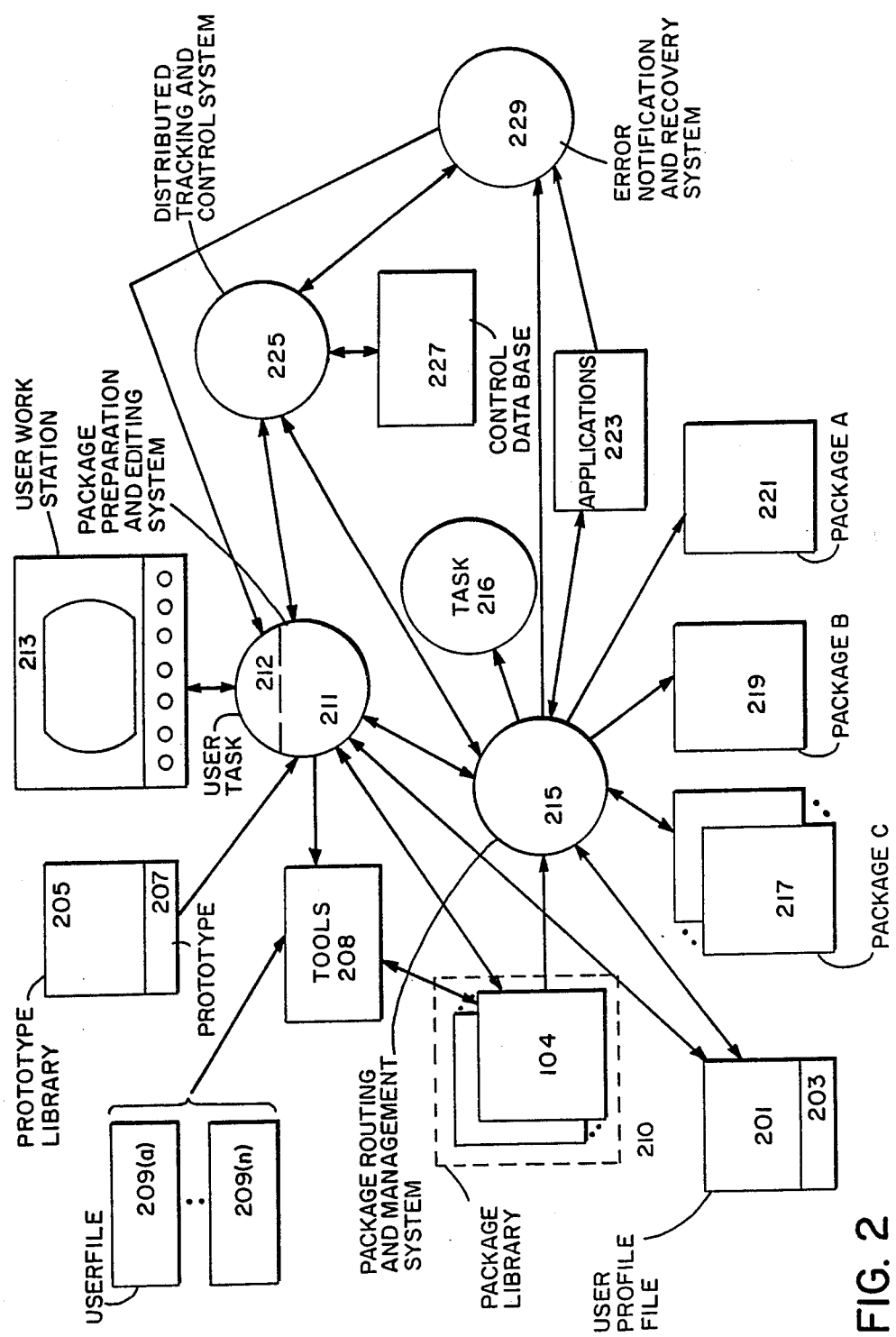
FIG. 2 is a block diagram of a preferred embodiment of apparatus 101.

2. Overview of a First Preferred Embodiment of Apparatus 101: FIG. 2

FIG. 2 is an overview of a preferred embodiment of apparatus 101. The embodiment is designed for use in a computer system wherein individual LCs 109 have mailboxes for sending and receiving messages via an electronic mail system. An example of such a system is VS multitasking processors manufactured by Wang Laboratories, Inc. which are connected by Wangnet and communicate by means of the mail component of Wang Office. In FIG. 2, squares indicate data structures, circles indicate tasks, and UWS 213 indicates a user work station with CRT and keyboard. Arrows indicate the flow of information between the components of the apparatus.

Beginning with the processing components, package preparation and editing system (PPES) 211 is the general user interface to apparatus 101. PPES 211 runs in user task (UT) 212, which interacts with UWS 213 and sends messages to and receives them from other tasks via the mail system. Using PPES 211, a user can define types of packages, create packages 104, modify a package's contents and the way they are processed and determine status of a package 104. Package routing and management system (PRMS) 215 is a task which executes PD 105 in PKG 104. Distributed Tracking and Control System (DTCS) 225 is a task which keeps track of the current location and status of packages 104 and permits users of apparatus 101 to control processing asynchronously by means of control commands. Error notification and recovery system (ENRS) 229, finally, is a task which notifies users of the system of errors and carries out recovery procedures. PRMS 215, DTCS 225, and ENRS 229 will be accessible to any LC 109 processing a package 104, and PPES 211 will be accessible to any LC 109 which creates or edits a package 104. Communication between UT 212 and PRMS 215, DTCS 225, and ENRS 229 the tasks is by means of messages sent via the mail system. As may be seen by the above description, PRMS 215, DTCS 225, and ENRS 229 represent an expanded embodiment of INT 111 and SR 113.

Returning to the data structures, PPES 211 constructs PKG 104 in PKGLIB 210, a file system library on LC 109 accessible to PPES 211, PRMS 215, DTCS 225, and ENRS 229. To construct PKG 104, PPES 211 uses prototype library (PTL) 205, programs for manipulating the contents of PKG 104 in TOOLS 208, and user files (UF) 209. PTL 205 contains a set of prototypes (PTYPE) 207. Each PT 207 is a prototype of a certain type of PKG 104. In response to a PTYPE 207, PPES 211 interacts with the user via UWS 213 to obtain the information needed to construct a PKG 104 of the given type. The user may specify entire UFs 209, which PPES 211 then copies into PKG 104 using programs in TOOLS 208 specific to the type of UF 209. The user may also specify data, which PPES 211 may use as specified in PTYPE 207 to create a file in PKG 104, again using programs in TOOLS 208. If a user wishes to manipulate a file in PKG 104, PPES 211 automatically determines the type of the file and provides the user with the program from TOOLS 208 proper to the kind of file when the user desires to manipulate it.

PPES 211 constructs PD 105 in PKG 104 from information obtained from PTL 205 and user profile file (UPF) 201, which contains information about users of LC 109, and may further obtain information from the user. PPES 211 manipulates PD 105, like the other files, using programs from TOOLS 208. In some cases, the user may simply write his own PD 105, using programs provided by PPES 211 from TOOLS 208.

Once the user has specified a PTYP 207, provided the information needed to make PD 105, and specified the proper UFs 209, PPES 211 creates PKG 104 containing the PD 105 made from PTYP 207 and copies of UFs 209. During creation of PKG 104, PPES 211 receives a unique identifier for PKG 104 from DTCS 225. PKG 104 will be the only PKG 104 in apparatus 101 with the identifier and will keep the same identifier until processing is terminated and PKG 104 is destroyed.

When PKG 104 is finished, PPES 211 sends a message to PRMS 215 indicating PKG 104's existence. PRMS 215 then begins executing the steps in PD 105. When a step specifies that PKG 104 be routed to another LC 109, PRMS 215 routes PKG 104 via mail system 107 to that LC 109. After PKG 104 has been sent, it is deleted from PKGLIB 210. In that LC 109, PRMS 215 responds to the arrival of PKG 104 by copying it into PKGLIB 210 in the LC 109. Thereupon, the recipient of PKG 104 may use PPES 211 to manipulate PKG 104 in the manner described with regard to the creation of PKG 104. As a consequence of the editing, steps local to the recipient LC 109 may be added to PD 105 and the local steps may be executed by PRMS 215. As will be explained in more detail later, PRMS 215 interacts with DTCS 225 to determine whether a PKG 104 is valid and whether there is a control command pending for PKG 104.

In executing steps at an LC 109, PRMS 215 employs user profile file (UPF) 201, tasks 214, and application programs (APPS) 223. If a task 214 or an application program 223 is interactive, it will output data to and receive it from UWS 213. UPF 201 is a file which contains user profile records (UPRs) 203 for all of the users of LC 109 who can receive mail via the mail system. Included in the records is information such as the user's title and current supervisor. Thus, PD 105 may specify those involved in processing a PKG 104 by title or relative position. When PRMS 215 processes PD 105, it uses UPF 201 to resolve titles or relative positions into a user of LC 109. PD 105 may specify either processing directly by PRMS 215 or by a task 215 with which PRMS 215 communicates by means of the mail system. In the first case, PRMS 215 executes a program in APPS 223; in the second case, PRMS 215 sends a message to the task 215 and the task 215 does the processing. Often, the processing involves output of screens of data to UWS 213 and receipt of input from UWS 213. In both cases, of course, the processing may result in alteration of or additions to data 103 in PKG 104. PD 105 may further specify that PRMS 215 produce package copies (PKGC) 217 from PKG 104, backup packages (PKGB) 219 from PKG 104, or archive packages (PKGA) 221 from PKG 104. PKGCs 217 are used in situations where parallel processing is useful. Each PKGC 217 is an exact copy of PKG 104 at the time the copy is made, but each is given its own unique identifier which indicates that it is a copy for parallel processing. Processing of each of the copies continues independently from the point at which the copies were made. Backup packages 219 are copies of PKG 104 which are made prior to crucial operations or in order to make recovery possible. If an operation fails after a PKGB 219 is made, DTCS 225 locates PKGB 219 and restarts processing using PKGB 219 instead of the lost or damaged original PKG 104. Archive packages 221, finally, are copies of PKG 104 which are made for archival purposes. These copies are not processed further by apparatus 101.

As its name implies, DTCS 225 has both tracking and control functions. As part of the tracking function, DTCS 225 provides the unique identifier to PKG 104, tracks PKG 104 as it is processed, confirms that a transfer has taken place, maintains CTLDB 227, informs ENRS 229 of any errors it detects, and provides status information on PKG 104 to users of apparatus 101. As part of the control function, DTCS 225 receives control commands from users, sends them to LC 109 at which PKG 104 is currently being processed, and provides the received control commands to PRMS 215 for execution. PRMS 215 checks with DTCS 225 for control commands on arrival of PKG 104 in LC 109 and before sending PKG 104 to the next LC 109. In the first case, PRMS 215 executes the control commands before performing any other processing in LC 109 and in the second case, it executes the control commands before sending PKG 104 to the next LC 109. PRMS 215 may also check for control commands after a time interval specified in a control command or in PD 105.

In a preferred embodiment, the control commands include a terminate command to which PRMS 215 responds by terminating processing of PKG 104, a reroute command to which PRMS 215 responds by rerouting PKG 104 to a different LC 109, a backup command to which PRMS 215 responds by creating a PKGB 219, a restart command to which PRMS 215 responds by locating a backup package 219 made by apparatus 101 and restarting processing using that backup package, timing constraint commands which specify an action to be taken if a certain amount of time has elapsed, a suspend command which suspends execution of RT 315, a resume command which resumes execution of RT 315, and a cleanup command which removes references to a PKG 104 from CTLDB 227. Other embodiments may include additional control commands.

Information concerning the location and status of PKG 104 is contained in control data base (CTLDB) 227. There is a local CTLDB 227 in each LC 109; in addition, in a preferred embodiment, groups of LCs 109 may maintain a group CTLDB 227 and the entire system may have a central CTLDB 227. The group and central CTLDBs 227 consolidate information from the local CTLDBs 227. DTCS 225 on each LC 109 provides status information to and receives control commands from users via messages to and from UT 212. If PKG 104 is on the local LC 109, the status information is received directly from the local CTLDB 227 and the control commands are provided directly to the local DTCS 225. If PKG 104 is elsewhere, the local DTCS 225 uses the group and central CTLDBs 227 to locate the LC 109 currently processing PKG 104. It then requests status information from or provides control commands to the DTCS 225 on that LC 109. In other embodiments, there may be a single central CTLDB 227 in addition to the local CTLDBs 227.

Error notification and recovery system 229, finally, deals with errors detected by PRMS 215, APPS 223, DCTS 225, or users in the course of processing. Errors include duplicate PKGs 104, corrupted PKGs 104, or lost PKGs 104. When an error is detected, the component of apparatus 101 which detects the error notifies ERNS 229, which in turn indicates to DTCS how the error is to be dealt with. In some cases, ERNS 229 can deal with the error without assistance; in others, ERNS 229 requires assistance from a user, which it receives by sending a message to the proper UT 212. For example, when a PKG 104 is lost, that fact is detected as described above by DTCS 225 in the last LC 109 to send PKG 104 on. That DTCS 225 informs ENRS 229 that PKG 104 is lost. ENRS 229 then inquires of DTCS 225 on the destination LC 109 concerning PKG 104. If PKG 104 is dead, or if DTCS 225 on the destination LC 109 has received a command to terminate it ENRS 229 then determines whether PKG 104 should be restarted from a PKGB 219. ENRS 229 may make the determination from information associated with the package type or by querying a user via UWS 213. If PKGB 219 is to be restarted, ENRS 229 asks DTCS 225 to determine the location of the most recent backup and then issues a backup and restart command specifying that backup to DTCS 225. In response to the command, PRMS 215 substitutes PKGB 219 for the lost package. Depending on the circumstances, PRMS 215 may execute all steps in PD 105 following the step in which the backup was made or may simply pass PKGB 219 on to the point where the original package was lost.

Figure 3:
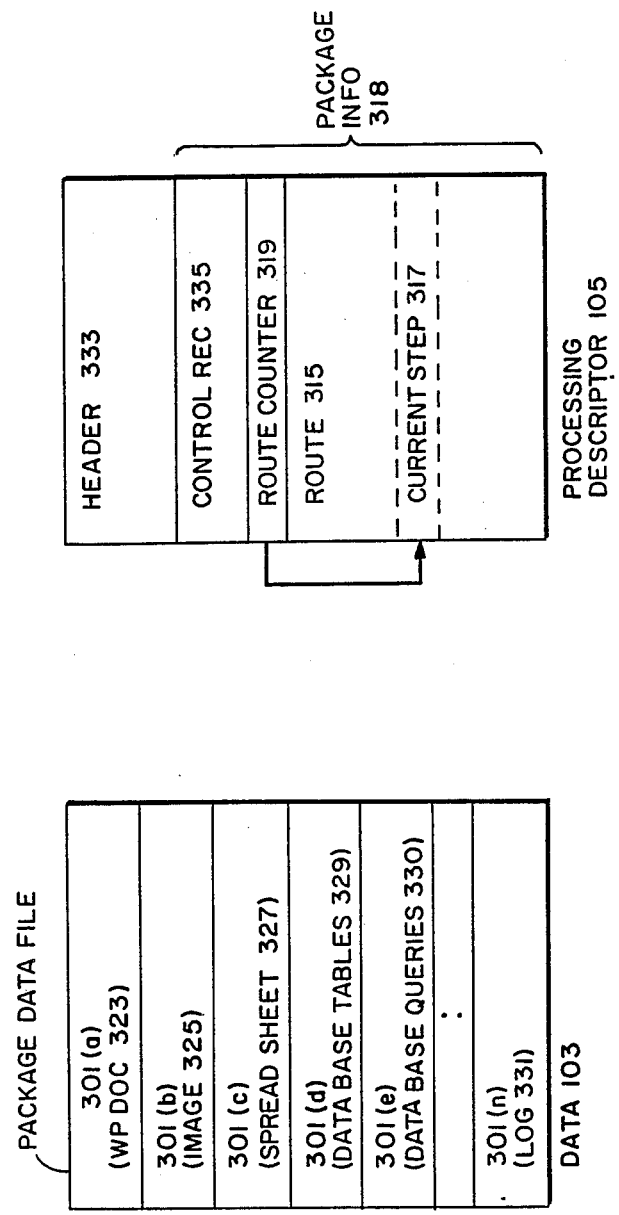
FIG. 3 is a detail of package 104 of apparatus 101.
Figure 3A:
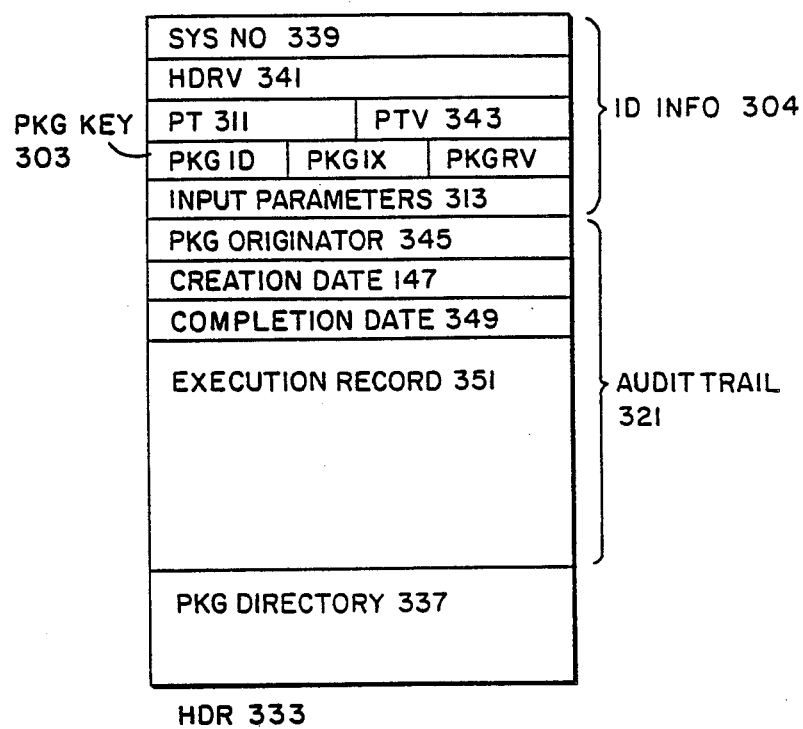
FIG. 3A is a detail of HDR 333 of package 104.
Figure 3B:
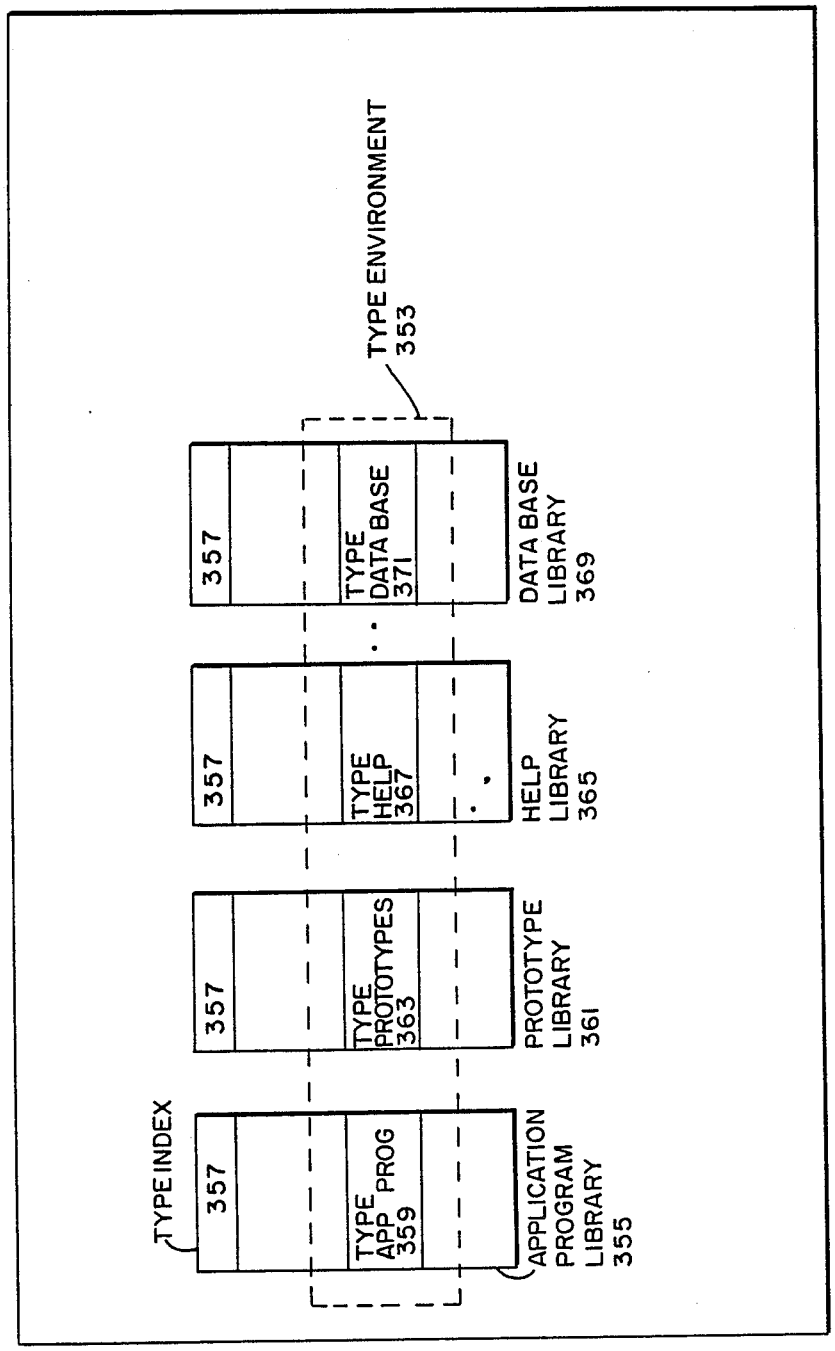
FIG. 3B is a diagram of a type environment in LC 109.

3. Detail of PKG 104: FIGS. 3, 3A, and 3B

FIG. 3 is a diagram of PKG 104 in a preferred embodiment of apparatus 101. PKG 104 has two parts: data 103 and processing descriptor (PD) 105. Beginning with data 103, data 103 consists of package data files (PDF) 301. A PDF 301 may be any kind of file which an LC 109 in the computer system can deal with. Examples of PDFs 301 which might be in a typical PKG 104 include word processing documents (WPDOC 323), images of documents (IMAGE 325), spread sheets (SS 327), data base tables (DBTAB 329), and data base queries (DBQ 330). The queries may run on tables in DBTAB 329 or in the LCs 109 which will process PKG 104. A PKG 104 might also include files reserved for use of apparatus 101. One such file is a log file (LOG 331) in which is recorded a list of recipients for PKG 331, their responses to PKG 104, and the times at which the responses were made. Using PPES 211, the current recipient of PKG 104 may view LOG 331 to determine how other recipients responded to PKG 104, and when the current recipient responds, his response is recorded in LOG 331.

As with other files, access to individual PDFs 301 may be controlled. For example, all recipients of a PKG 104 may be permitted to read a certain PDF 301, but only certain recipients may be permitted to alter the PDF 301. Operations are performed on the PDFs 301 in the individual LCs 109 using the tools available in the LCs 109 for dealing with a given type of PDF 301. For example, if the PDF 301 is a WPDOC 323, a recipient who has the proper access may use a word processing editor to edit PDF 301, and if PDF 301 is a DBTAB 329, the recipient may use LC 109's data base system to manipulate DBTAB 329. PDFs 301 are placed in PKG 104 by PPES 211, which copies files specified by a PKG 104's originator or recipients into PKG 104.

Continuing with PD 105, in the preferred embodiment, PD 106 is a file. The file includes the following main components:
 HDR 333, information by which apparatus 101 identifies a specific PKG 104 in the system.
 PINFO 318, information used to determine how PKG 104 is to be processed.

HDR 333 is shown in detail in FIG. 3A. There are three main components: identification information (IDINFO) 304, which contains information by which PKG 104 is identified by apparatus 101, audit trail (AT) 321, which records the processing which PKG 104 has received up to the present point, and PDIR 337, which is a directory of the PDFs 301 in PKG 104.

Beginning with IDINFO 304, SYSNO 330 identifies the apparatus 101 in which PKG 104 is being processed; HDRV 341 identifies the version of HDR 333. PT 311 identifies the type of PKG 104. Apparatus 101 uses PT 311 to associate PKG 104 with an environment in LC 109 suitable for the given type of PKG 104. PTV 343 is a type version number. The use of the version number permits users of apparatus 101 to retain a type while making new implementations of it.

The relationship between a package type and an environment is shown in FIG. 3B. When PKG 104 of a given type is processed in LC 109, the processing involves application programs, prototypes, HELP screens, and a data base. The application programs are stored in application program library (APPL) 305, with application programs for a specific package type being stored in TAPPR 359. Type index (TI) 357 permits PRMS 215 in LC 109 to locate TAPPR 359. Similarly, TI 357 in prototype library (PTL) 361 permits location of type prototypes (TPTYP) 363 for the package type, TI 357 in HELP library (HELPL) permits location of THELP files 367 containing information needed by users of LC 109 who are processing PKGs 104 of the type in question, and TI 357 in data base library (DBL) 369 permits location of data bases in LC 109 which are accessed by PKGs 104 of the type, indicated here as TDB 371. TAPPR 359, TPTYP 363, THELP 367, and TDB 371 together make up type environment (TENV) 353.

PKGKEY 303 is the unique identifier by which apparatus 101 identifies PKG 104 from its creation until its destruction. PKGKEY 304 has three components:
 PKGID 305 is the unique identifier provided by DTCS 225 to PPES 211 when PKG 104 was created. All copies and restarts of PKG 104 will have the same PKGID 305.
 PKGIX 307 is PKG 104's index. Each copy of PKG 104 which is made for further processing is distinguished from the original and from other copies by means of its index number in PKGIX 307.
 PKGRV 309 is PKG 104's restart version number. Each time PKG 104 is restarted, the new package receives a different version number in PKGRV 309.

Each of the above numbers is provided by the local DTCS 225 on which PKG 104 is created, split, or restarted. Uniqueness of the numbers is assured by giving each LC 109 an identifier which is unique in the system in which apparatus 101 is implemented and employing the LC 109's identifier as a prefix to numbers generated by an incrementing counter in the LC 109.

Input parameters (IPs) 313 are parameters provided by users who create or process PKG 104. The purpose of the parameters is to provide names by which users can recognize PKG 104 and which they can provide to DTCS 225 when they wish to locate a PKG 104. For example, in an ordering process, the parameters might include the name of the customer making the order, the name of his salesman, the sales office location, the order number, and so forth.

AT 321 is an audit trail for PKG 104. In AT 321, PO 345 identifies the originator of PKG 104, CRD 347 is the date of creation of PKG 104, and COMPD 349 is the date of completion of processing of PKG 104. EXEC REC 351, finally, is a representation of the steps already executed on PKG 104 and the result of the execution of the steps. If the step involved a branch, EXEC REC 351 for the step indicates which branch was actually taken; if an error message was returned when a step was executed, the error number for the message is associated with the step in EXEC REC 351. AT 321 is maintained by PRMS 215 and is used by DTCS 225 to determine the present status of PKG 104.

Package directory (PDIR) 337 is a directory of the files in PKG 104. For each file, it specifies the file's title, its type, and its filename. All files belonging to a PKG 104 are kept in a file system library accessible to PPES 211 and PRMS 215 during the visit of a PKG 104 to LC 109, and the file name specifies that system library.

Returning to FIG. 3 and continuing with PINFO 318, route (RT) 315 specifies the LCs 109 to which PRMS 215 is to transfer PKG 104 and the steps to be performed at each LC 109. Within the LC 109, PRMS 215 may perform a step directly by executing a program from APPS 223, or it may perform the step by sending a message to a mailbox associated with a task 216 in LC 109 and waiting for a return message. In many cases, the task 216 will be interactive, i.e., the task 216 will respond to the message by executing a program which displays a screen on UWS 213 and receives input from UWS 213. Data resulting from the operation may then be returned to PRMS 215 for use in determining which step will be executed next. In FIG. 3, CS 327 represents the current step, i.e., the step in RT 315 currently being executed by PRMS 215. Route counter (RC) 319 in PINFO 318 always indicates the location of CS 327, and is consequently updated at the end of execution of each step to point to the next step in RT 315. In a preferred embodiment, certain recipients of PKG 104 may have access to RT 315. Using a route editor component of PPES 211, such recipients may alter that portion of RT 315 which has not yet been executed.

Figure 4:
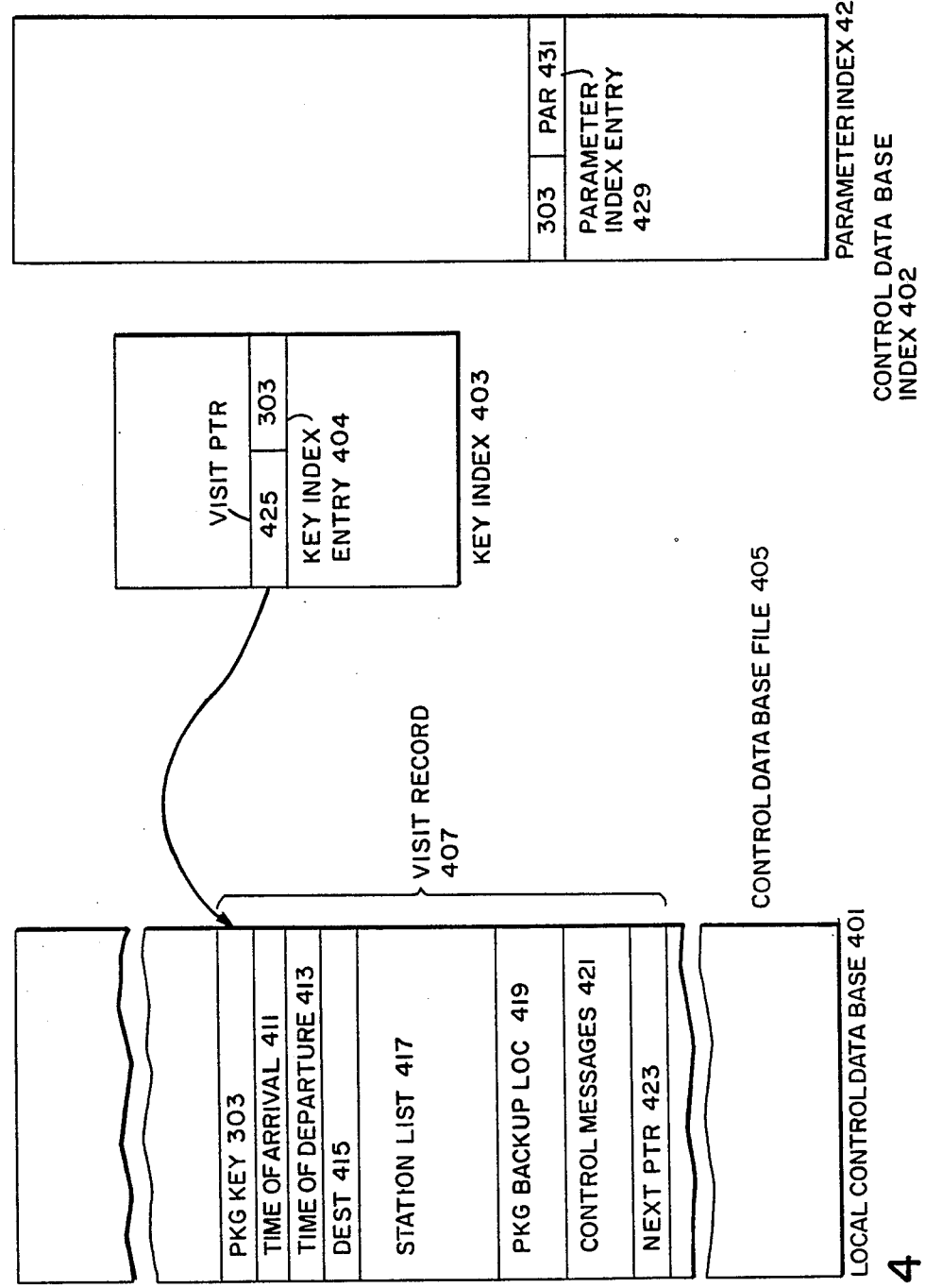
FIG. 4 is a detail of a local control data base.
Figure 5:
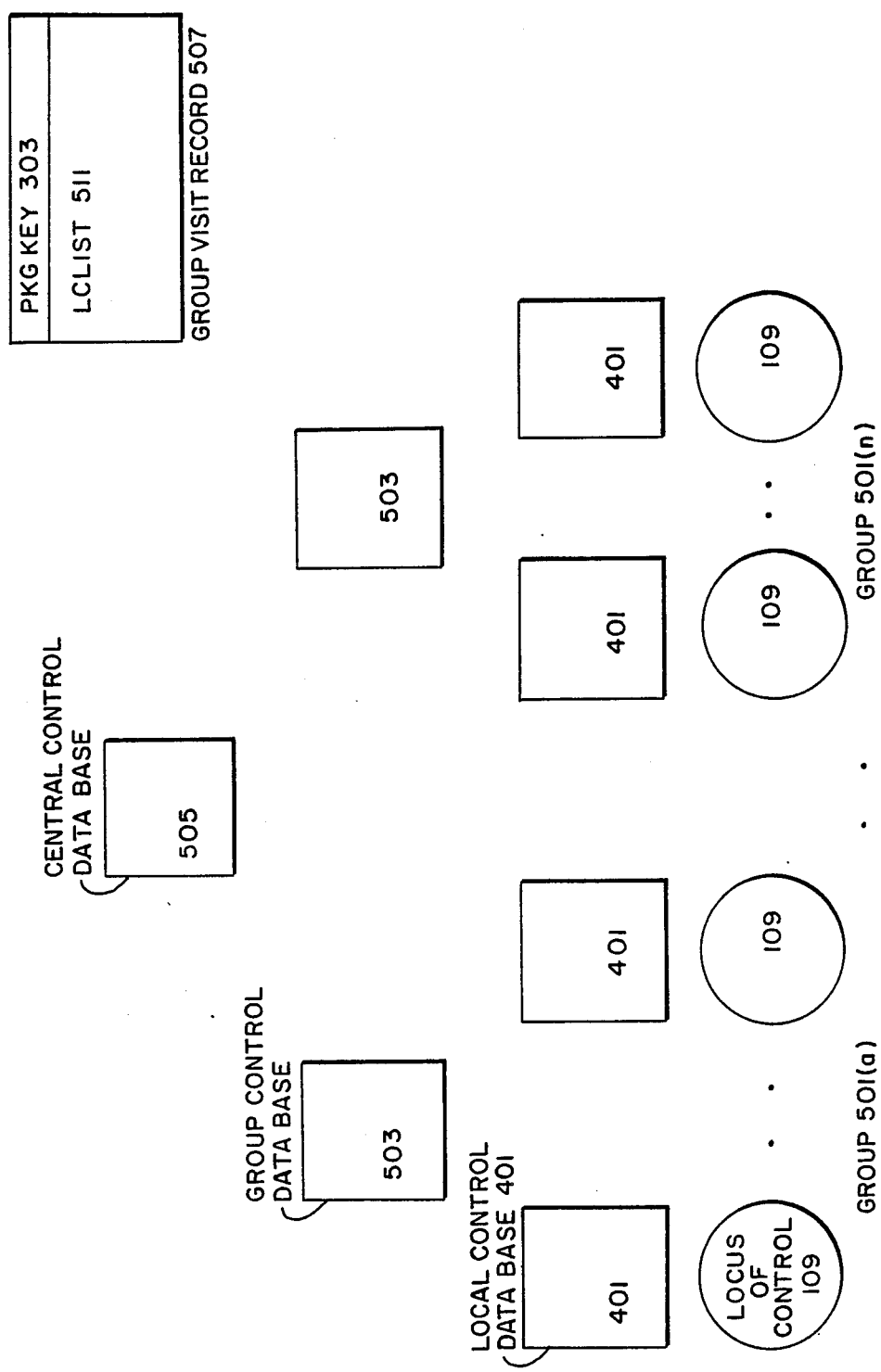
FIG. 5 is a diagram of the control data base system in a preferred embodiment.

4. Detail of CTLDB 227: FIGS. 4 and 5

As previously mentioned, DTCS 225 keeps the information it needs to track and control PKGs 104 in control data base (CTLDB) 227. In the preferred embodiment, CTLDB 227 is a hierarchy of data bases. The hierarchy is shown in FIG. 5. The lowest level of the hierarchy is local CTLDB (LCTLDB) 401. Each LC 109 has a LCTLDB 401 associated with it which keeps track of PKGs 104 which still exist in apparatus 101 and have been processed or are currently being processed by that LC 109. A number of LCs 109 may be treated as a group (GRP) 501. Each GRP 501 has associated with it a group CTLDB (GCTLDB) 503, which keeps track of which LCs 109 in GRP 501 have processed or are processing each PKG 104 and the order in which they have processed the PKG 104. GCTLDB 503 is associated physically with one of the LCs 109 in GRP 501. The highest level of the hierarchy is central CTLDB (CCTLDB) 505, which keeps track of which GRPs 501 have processed or are processing each PKG 104 and the order of that processing. CCTLDB 505 is associated physically with one of the LCs 109 making up the overall system in which apparatus 101 is implemented.

The hierarchy is used to locate a given PKG 104 as follows: The DTCS 225 attempting to locate PKG 104's status first searches LCTLDB 401 associated with DTCS 225 s LC 109. If there is no record of PKG 104 there, the searching DTCS 225 sends a message to DTCS 225 on LC 109 which has GCTLDB 503 for GRP 501 to which the searching DTCS 225 belongs. As shown in FIG. 5, GCTLDB 503 contains a GVREC 507 for each PKG 104 which has visited GRP 501. Each GVREC 507 contains PKGKEY 303 for the PKG 104 represented by GVREC 506 and a list (LCLLIST) 511 of the LCs 109 visited by PKG 104 in GRP 501. The list is arranged in the order in which PKG 104 visited the LCs 109.

If there is a record of PKG 104 there, that DTCS 225 returns a message to the searching DTCS 225 indicating the LC 109 which is currently processing. If there is none, that DTCS 225 sends the search message on to DTCS 225 having CCTLDB 505. In CCTLDB 505, there is one record for each PKG 104 presently active in system 101. The records in CCTLDB 505 are similar to GVRECs 507, except that the list is a list of GRPs 501 visited by PKG 104. GCTLDB 503 and CCTLDB 505 are both arranged to that the records can be located by PKGKEY 303 for a PKG 104.

The record for PKG 104 in CCTLDB 505 indicates GRP 501 containing PKG 104, DTCS 225 sends the message on to the DTCS 225 for that GRP 501's GCTLDB 503, and that DTCS 225 sends the message on to DTCS 225 for LC 109 presently processing PKG 104, which locates PKG 104 in LCTLDB 401 for the LC 109. In some cases, PKG 104 may have left the LC 109 by the time the message reaches it; in that case, the record of the visit in LCTLDB 401 indicates the next LC 109 and DTCS 225 sends the message on to that LC 109. If the message indicates that the searching DTCS 225 wants to know the status of PKG 104, DTCS 225 for LC 109 present processing PKG 104 returns the status to the searching DTCS 225; if the message contains a control command, the local DTCS 225 places the control command in LCTLDB 401. In other embodiments, there may be only LCTLDBs 401 and searching DTCS 225 may simply broadcast its message to all the other DTCSs 225. The DTCS 225 for LC 109 currently processing PKG 104 will then simply carry out the operation specified in the message.

FIG. 4 presents a detailed diagram of LCTLDB 401. LCTLDB 401 consists of CTLDB file (CLTDBFI) 405, which contains visit records (VRECs) 407. each one of which represents a single visit by a single PKG 104 to LC 109 with which LCTLDB 401 is associated, and CTLDB index (CTLDBIX) 402, which is an index to the VRECs 407 in CTLDBFI 405. CTLDBIX 402 has two levels. The first level, parameter index (PIX) 427 relates each of the input parameters (IPs) 313 identifying a PKG 104 which has visited the LC 109 to PKGKEY 431 for PKG 104. Thus, each parameter index entry (PIE) 429 contains one of the input parameters (PAR) 431 and PKGKEY 431. PIEs 429 in PIX 427 are ordered by the value of PAR 431, and consequently, PIE 429 containing a given PAR 431 may easily be located by search techniques well known in the art. Once PIE 429 has been located, PKGKEY 431 is used to locate key index entry (KIE) 404 in key index (KIX) 403. KIE 404 contains PKGKEY 431 and VPTR 425, a pointer to the first VREC 407 in a chain of VRECs 407 representing visits of PKG 104 to LC 109. KIEs 404 are arranged in KIX 403 by the value of PKGKEY 303, permitting easy location of KIE 404 for a given PKGKEY 431 by means of various well-known search techniques. GCTLDB 503 and CCTLDB 505 are referenced only after PKGKEY 303 has been obtained from a LCTLDB 401, and consequently, those data bases have only KIX 403.

VREC 407 for a given visit by a PKG 104 to a LC 109 contains the following information:

PKGKEY 303 for the PKG 104 represented by VREC 407;

TOA 411, the time of arrival of the PKG 104 for the visit represented by VREC 407 in LC 109;

TOD 413, the time of departure of the PKG 104 from the visit;

DEST 415, the LC 109 and mailbox therein to which PKG 104 departed. DTCS 225 uses this field to send messages on which arrive after a PKG 104 has left LC 109.

STALIST 417, the list of mailboxes in LC 109 to which PKG 104 was directed by PRMS 215 during processing. Each entry in the list includes the name of the mailbox, the time arrival at the mail box, any status message returned from the mail box, and the time of return from the mailbox;

PKGBLOC 419, the locations of any backup packages 219 created during the visit;

CTLMESS 421, control messages concerning PKG 104 received in DTCS 225 during the visit; and NPTR 423, the location in CTLDBFI 405 of VREC 407 for the next visit of PKG 104 in LC 109.

When a PKG 104 arrives in an LC 109, DTCS 225 makes a VREC 407 and any necessary entries in CTLDBIX 402 for the PKG 104. Additionally, DTCS 225 sends a message to DTCS 225 associated with GCTLDB 503 for GRP 501 to which LC 109 belongs indicating the arrival of PKG 104 in LC 109. Finally, if GCTLDB 503 indicates that PKG 104 is newly arrived in GRP 501, the DTCS 225 associated with GCTLDB 503 sends a message to DTCS 225 associated with CCTLDB 505 indicating the arrival of PKG 104 in GRP 501. To increase efficiency of operation of apparatus 101, these messages may not be sent immediately to the relevant data bases, but may be collected and sent in a batch. GCTLDBs 503 and CCTLDB 505 will consequently not always be current, but as previously explained, DEST field 415 in VREC 407 for a visit permits a message to follow a PKG 104 which has already left a given LC 109.

As may be seen from the preceding descriptions, CTLDB 227 not only permits DTCS 225 to locate PKGs 104 anywhere in the system of apparatus 101, but also permits DTCS 225 to cause PRMS 215 to execute a control command upon arrival of PKG 104 in LC 109 or departure of PKG 104 therefrom and permits DTCS 225 to compare the audit trail information in AT 321 of a PKG 104 with the information in VREC 407 to determine whether a PKG 104 has been damaged or whether it is a duplicate. For example, when a PKG 104 arrives at an LC 109 which already has a VREC 407 for the PKG 104, DTCS 225 compares AT 321 with the contents of STALIST 417. If AT 321 does not indicate a previous visit in LC 109 whose steps include the mailboxes specified in STALIST 417, PKG 104 may be a duplicate. In this situation, DTCS 225 blocks further processing of the PKG 104 and informs ENRS 229 of the error condition. ENRS 229 may then issue a termination control command for PKG 104 to DTCS 225.

Figure 6:
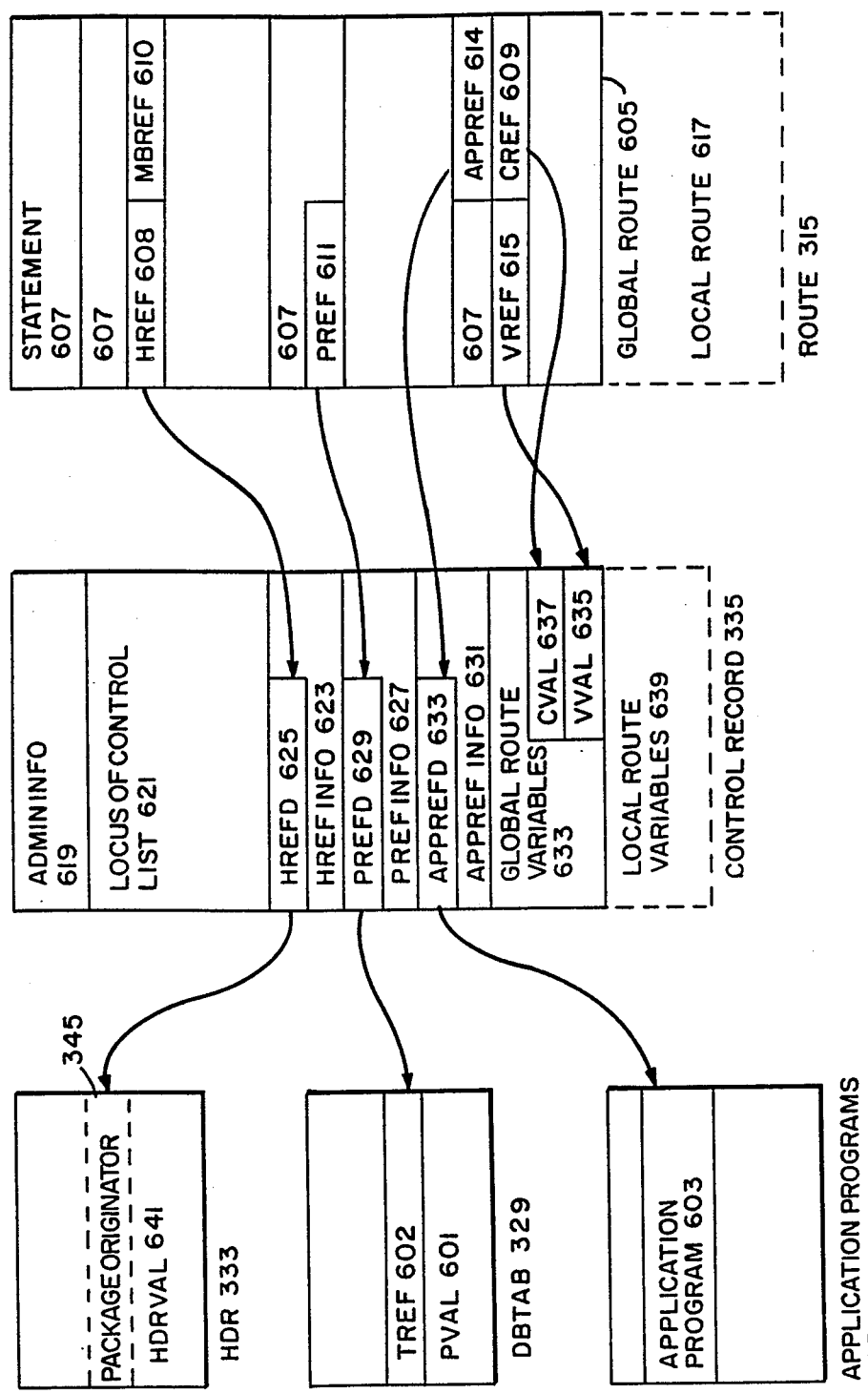
FIG. 6 is a detail of processing information 318.

5. Detail of Processing Information (PINFO) 318:
FIGS. 6 and 7

FIG. 6 is a diagram of PINFO 318, the portion of processing descriptor 105 which specifies how PRMS 215 in each specified LC 109 is to process PKG 104. PINFO 318 in a preferred embodiment has at least the following components: RT 315 and control record (CTLREC) 335. RT 315 always includes at least GRT 605, a portion of RT 315 which accompanies PKG 104 to every LC 109 which will process it and consequently specifies the processing of PKG 104 at the highest level. Additionally, one or more local routes (LRT) 617 may be executed from GRT 605 or another LRT 617 in a LC 109.

GRT 605 and any LRT 617 consist of a sequence of statements 607. In a preferred embodiment, the statements are sequences of ASCII characters which are interpreted by PRMS 215. The statements may include references to data and to programs in APPS 223. In the preferred embodiment, there are five kinds of references: constant references (CREF) 609, which refer to values which remain constant for every execution of a route, variable references (VREF) 615, which refer to values which may change during execution of a route, package references (PREF) 611, which are read only references to data fields in one or more of the PDFs 301 making up data 103 in PKG 104, header references (HREF 608), which are references using predefined names to fields in HDR 333, application program references (APPREF) 614, which are references invoking application programs in APPS 223, and mail box references (MBREF) 611, which refer to mailboxes in the electronic mail system.

The data referred to by CREFs 609 and VREFs 615 is contained in locations in CTLREC 335. If the CREFs 609 and VREFs 615 are in GRT 605, the values are in GRTVARS 633. If an execution of a LRT 617 requires its own local storage for variables, that storage in LRTVARS 639. Thus, as shown in FIG. 6, GRTVARS 633 contains CVAL 637, represented by CREF 609, and VVAL 635, represented by VREF 615. For the other reference types, CTLREC 335 contains descriptors which permit location of the values represented by the references in HDR 333, PDFs 301, or APPs 223. Thus, header reference info (HREFINFO) 623 contains header reference descriptors (HREFD) 625 permitting location of header values (HDRVAL) 641 in HDR 333 such as PO field 345. Similarly, package reference info (PREFINFO) 627 contains package reference descriptors (PREFD) 629 permitting location of package values (PVALs) 601 such as table reference (TREF) 602 in DBTAB 309 and application program reference info (APPREFINFO) 633 contains application reference descriptors (AOPREFDs) 633 by means of which PRMS 215 can invoke application programs (APPRs) 603 in APPS 223. The reference information is placed in CTLREC 335 by PPES 211 when a PKG 104 is created or RT 315 is altered.

The remainder of CTLREC 335 contains administration information (ADMININFO) 619 and locus of control list (LCLIST) 621. ADMININFO 619 includes a identification of the central administrator for the type of PKG 104 represented by the package, the name of LOG 331, and in embodiments in which DTCS 225 has a single central CTLDB '227 instead of a hierarchy, the name of LC 109 where CTLDB 227 resides.

LCLIST 621 contains a list of all of the LCs 109 in which an environment for this particular package type is maintained. The entry for each LC 109 in the list further identifies the local package administrator for packages of that type on the given LC 109. When a recipient of PKG 104 modifies RT 315, PPES 211 uses LCLIST 621 to make sure that the modified RT 315 does not send PKG 104 to a LC 109 which has no environment for that type of package. Similarly, PPES 211 uses CTLREC 335 to check the correctness of references in the modified RT 315. Both ADMININFO 619 and LCLIST 621 are placed in CTLREC 335 when PKG 104 is created.

Continuing with FIG. 7, that figure shows a simple example route 701. Depending on the complexity of the process being dealt with by apparatus 101, route 701 could be either a GRT 605 or a LRT 617. Route 701 defines a process in which a package containing an expense report file is first routed to the originator's manager for approval and then if approval is received, is sent to the originator s finance representative and to accounts payable. A backup copy of the package is made after the package returns from the finance representative and an archive copy is made in the accounts payable department.

The main syntactical constructs in route 701 are comments, statements (STA 607), lists of statements, and groups of statements. A comment (COMM) 705 is a portion of route 701 which is not interpreted by PRMS 215. In a preferred embodiment, comments are bracketed by the "!" character. A statement (STA) 607 is a sequence of keywords, predefined names, user-defined names, and expressions. A predefined name is one whose meaning is part of the route language and a user defined name is one whose meaning is defined by the user. A list of statements is a sequence of statements terminated by a period. A group of statements is a named sequence of statements which begins with a GROUP statement and ends with an END statement. Groups serve to subdivide route 701 for purposes of flow of control and error handling.

Names in route 701 include predefined names such as ORIGINATOR, ORIGINATOR'S MANAGER, ORIGINATOR'S FINANCE REPRESENTATIVE, CURRENT LOCATION, and ROUTE ADMINISTRATOR. All of these names resolve to MBREFs 611. ORIGINATOR is resolved by reference to PO field 315 of HDR 333 and is therefore HDRREF 608 which resolves to a MBREF 611. ORIGINATOR S MANAGER and ORIGINATOR'S FINANCE REPRESENTATIVE are resolved from user profile file (UPF) 201 on LC 109 where PKG 104 was created; the values from UPF 201 are placed in GRTVARS 633. CURRENT LOCATION is LC 109 which PKG 104 is currently visiting, and CURRENT LOCATION'S ROUTE ADMINISTRATOR resolves to the mailbox of the current LC 109 which UPF 201 for that LC 109 specifies as the route administrator; the values are similarly placed in GRTVARS 633. An expression is made up of literal constants, names which have values, and operators such as arithmetic operators, comparison operators, and logical operators.

User defined names include SUCCESSFUL and FAILURE, which are named constants (CON 702), and "manager-approval", which is a variable (VREF 615). ERA-FORM.FORM-ID is a package reference (PREF) 611. ERA-FORM is the name of a data record in PDF 301 and FORM-ID is the name of a data field in that record As previously mentioned, PREFs 611 are read only, i.e., route 701 may use values of DFs 603 specified in PREFs 611 but may not set such values. A recipient of a PKG 104 may, however, set the values, and consequently, processing of a PKG 104 may be determined by modifications of PDFs 301.

The statements of route 701 are the following:

DEFINE defines SUCCESSFUL as a named constant and sets its value to 1. PRMS 215 responds to the statement by creating a location for the value in GRTVARS 633 or LRTVARS 639 as the case may be and setting the location to the value.

GROUP init and END init define the statements between them as a group named "init".

TO ORIGINATOR's MANAGER specifies that PRMS 215 is to send PKG 104 to the mailbox identified by the predefined name ORIGINATOR s MANAGER for further processing. TO has the general form TO <location>; where <location> resolves to a mailbox name.

RETURNS manager-approval indicates that the PRMS 215 which executed the TO statement is to suspend further processing until PKG 104 is returned. On return, the variable "manager-approval" will contain a value indicating whether the owner of the mailbox specified by ORIGINATOR'S MANAGER approved it. RETURNS is used generally in route 701 where execution of the next statement is to wait until execution of the previous statement is finished.

IF manager approval EQUAL FAILURE is a branching statement. If the value of manager approval is equal to the value 2 defined for FAILURE, PRMS 215 execute the list of statements TO ORIGINATOR TERMINATE; otherwise, it executes the statements from TO ORIGINATOR S FINANCE REPRESENTATIVE on.

TERMINATE terminates execution of Route 701. In response to a TERMINATE statement, PRMS 215 ceases execution of route 701, deletes PKG 104, and indicates to DTCS 225 that PKG 104 has been deleted. DTCS 225 updates CTLDB 227 to indicate that PKG 104 has been deleted and later deletes references to PKG 104 in CTLDB 227 in response to a cleanup command.

BACKUP causes PRMS 215 to create a backup copy (PKGB 219) of PKG 104. The RETURNS indicates that PRMS 215 is not to proceed until the backup succeeds.

CHECKPOINT causes PRMS 215 to send notice that the statement has been executed to DTCS 225, which checks LCTLDB 401 for LC 109 performing the CHECKPOINT operation, GCTLDB 503, and CCTLDB 505 for control commands before returning control to PRMS 215. PRMS 215 then acts on any control commands.

EXECUTE ARCHIVE RETURNS store-status specifies that PRMS 215 is to execute the program ARCHIVE of APPS 223 and is to wait until execution is finished to return.

ELSE indicates the branch of the IF statement which is to be taken if store-status is not equal to 1.

MESSAGE ""archive failed on form " ERA FORM.FORM ID "with a status of " store status" ACCOUNTS PAYABLE ROUTE ADMINISTRATOR indicates that PRMS 215 is to send a message to the mailbox represented by ACCOUNTS PAYABLE ROUTE ADMINISTRATOR with the ID of the expense form for which the archive failed and the value returned by the archiving program. The material between " marks is character strings used in the message.

ERROR ANY init indicates the action PRMS 215 is to take if any error occurs during execution of the statements in the group "init". Other ERROR statements may specify actions for specific errors encountered in executing "init".

AFTER 02/00/00 init indicates the action PRMS 215 is to take if more than 2 days elapse during execution of the group "init". 02/00/00 is a time specification of the type DD/HH/MM, indicating elapsed time.

Statements not used in example route 701 include the following:

- an assignment statement to which PRMS 215 responds by assigning a value to a variable;
- an EXIT <group name> statement to which PRMS 215 responds by going to the statement following the named group's END statement;
- a CARBON COPY <file list> TO <mailbox list> statement to which PRMS 215 responds by sending a copy of each of the PDFs 301 from PKG 104 which are on the file list to each of the mail boxes on the mail box list;
- a NOTIFY <mailbox> statement which establishes a default mailbox to be notified on error conditions;
- a SPLIT COPY1
  <statement list>
  COPYn
  <statement list> statement to which PRMS 215 responds by making as many copies of PKG 104 as specified in the statement and processing each copy as specified in the statement list for the copy;
- a WAIT CHECKPOINT FOR <time-specification>
  <statement list> statement to which PRMS 215 responds by sending a checkpoint to DTCS 225 and waiting for an acknowledgement for the amount of time specified in <time specification>. If none arrives, the statement list is executed. RETURN can be used in this statement to receive the reason why the acknowledgement failed.

As can be seen from FIG. 7 and the description of the statements, a route 315 may change the processing of a package depending on values in fields of PDF 301, on values in HDR 333, on values returned during processing, and on elapsed time. Moreover, it may make backup PKGs 219, make copies of a PKG 104 and send it to different mailboxes, split a PKG 104 for parallel processing, execute programs in APPS 223, coordinate processing of PKG 104 with DTCS 225, and terminate processing of PKG 104. Error handlers may further be defined in route 315 for different kinds of errors and different portions of route 315.

Figure 8:
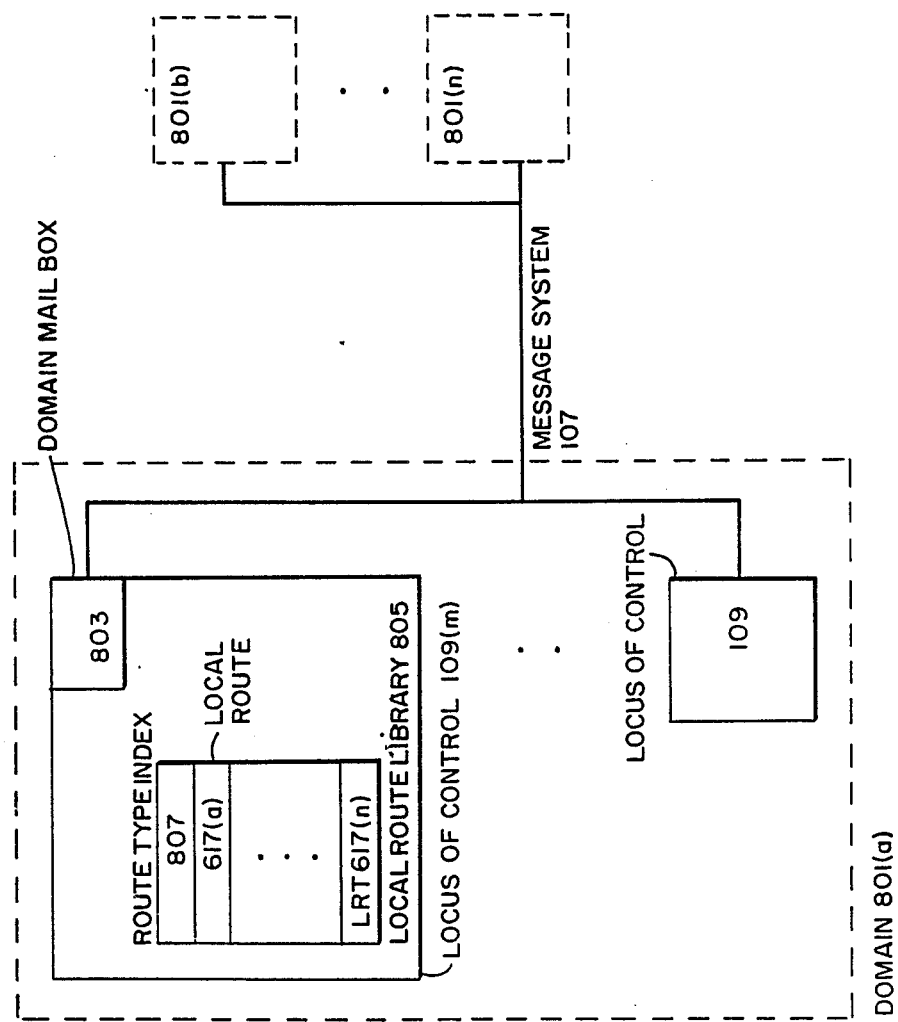
FIG. 8 is a diagram of domains in a preferred embodiment.

6. Expanding and Altering Routes 315: FIG. 8

An important property of a route 315 is that in a preferred embodiment, certain recipients of PKG 104 may have the right to alter route 315. When such a user receives notification that a PKG 104 has arrived, he may use PPES 211 to add steps to and delete steps from route 315. PRMS 215 then executes the altered route. Alteration of a route 315 may be done by means of a route editor in PPES 211, but may also be automated in the same fashion as creation of the route. PPES 211 may determine the type of PKG 104 from PT field 311 of PD 105 and may then obtain a PTYP 207 for the type from PTL 205, using information in UPF 201 to resolve predefined names in the PTYP 207. Free alteration of route 315 is possible in apparatus 101 because PRMS 215 functions strictly as an interpreter, i.e., when it finishes executing a given STA 607, it always executes whatever STA 607 is currently the next STA 607, and each time it encounters a reference in a STA 607, it resolves that reference according to the present meaning of the reference as specified in CTLREC 335.

In other embodiments, alteration of route 315 may also take the form of execution of a local route (LRT) 617. In such embodiments, route 315 is a global route (GRT) 605, i.e., it specifies only the LCs 109 at which main subdivisions of the processing of PKG 104 begin. Such an LC 109 is shown in FIG. 8 as LC 109(m). LC 109(m) contains local routine library (LRL) 805, which contains LRTs 617 for types of PKG 104 for which LC 109(m) is a main LC 109. LRL 805 is indexed by a route type index (RTI) 807, permitting location of LRT 617 for a given type of PKG 104 by package type. LRTs 805 for a given package type are thus part of TENV 353. When PKG 104 arrives in LC 109(m), PRMS 215 uses PT 311 to locate LRT 617 for PKG 104 and then executes LRT 617 as previously described, visiting the other LCs 109 specified in LRT 617 before going on to the next main LC 109 specified in GRT 605. Execution of LRT 617 in various embodiments of the invention may be by invocation or insertion. In the first case, which is analogous to a subroutine invocation, the execution of LRT 617 may be "hidden" from other LCs 109. Execution of GRT 605 may be suspended during execution of LRT 617, EXEC REC 351 may contain only a record of the invocation of LRT 617, and GCTLDB 503 and CCTLDB 505 may contain records only of the visit to LC 109 where LRT 617 was invoked, not of visits made in the course of execution of LRT 617. Additionally, temporary storage for variables of LRT 617 will be in LRTVARS 639. In the second case, the statements of LRT 617 are simply inserted into as part of GRT 605, and the execution is in no way hidden.

In still other embodiments, an LRT 617 may be invoked or inserted by means of a statement in route 315. One form of such a statement is a PERFORM <LRT-name> statement. The LRT name is the name of a LRT 617 available in LC 109 which PKG 104 is currently visiting, and in response to the PERFORM statement, PRMS 315 locates and executes the specified LRT 617. In still others, a LRT 617 may be specified or provided with a control command. When PRMS 315 executes the control command, it executes the specified LRT 617.

There are at least two reasons why it is advantageous that a route 315 may be altered during execution. The first is that it is never possible to anticipate all of the circumstances which may arise in the course of carrying out a business process. In apparatus 101, changed circumstances may be easily dealt with by altering route 315 to accommodate them. For example, if it becomes necessary to collect all PKGs 104 of a certain type currently being processed, this may be done simply by providing a control command with an LRT 617 specifying a single destination for all PKGs 104 of the type. When the control command is executed for each PKG 104, the PKG 104 is directed to the destination specified in LRT 617. Similarly, if it turns out that a given PKG 104 raises issues which require that it be sent to additional parties, the user in LC 109 in which the situation becomes apparent can modify RT 315 for that PKG 104 so that it is sent to those parties. As can be seen from the above examples, apparatus 101 permits modification of processing for both single packages and package types.

The second is that definition of a business process is itself often done at several levels. For example, the top management responsible for processing expense reports may describe their processing only in terms of which department does what, leaving definition of the processing steps within the individual department up to that department's management. Within the department, definition may again involve more than one level.

In apparatus 101, this kind of definition of a process is dealt with by establishing domains, as shown in FIG. 8. A domain 801 is a group of LCs 109 which correspond to a functional subdivision such as a department which is responsible for processing a PKG 104 of a given type. All of the LCs 109 are connected to each other and to LCs 109 in other domains by means of message system 107. One of the LCs 109 has a domain mail box (DMB) 803 which receives all PKGs 104 to be processed by the domain 801. LRL 805 in that LC 109 contains a LRT 617 designed by the workers in the domain which specifies the steps to be performed in that domain. In GRT 605 of PKG 104, the processing of PKG 104 is specified by means of TO statements specifying the DMBs 803 of domains 801(a . . . n) for the process. When PKG 104 arrives in a DMB 803, LRT 617 for that type of PKG 104 is executed as described above, and when execution is complete, PKG 104 is sent to the next DMB 803 specified in GRT 605. Alternatively, a recipient at DMB 803 may specify the processing within domain 801(a).

The combination of alterable RTs 315 with control commands provided to PRMS 215 by DTCS 225 provides superior control over PKG 104. Control by alteration of RTs 315 is synchronous with the execution of steps in RT 315 and is performed by the recipient of PKG 104 at the LC 109 where it is currently being processed; it thus provides a mechanism by which processing of PKG 104 may be altered to deal with conditions local to a LC 109 or a domain 801 at the time processing occurs there. Control by means of control commands may be performed from any LC 109 at any time, and thus provides a mechanism by which processing of PKG 104 may be altered to deal with conditions which are not perceived by or cannot be dealt with by LC 109 currently processing PKG 104. The two forms of control further correspond to the multi level nature of business processes: alteration of RT 315 provides microscopic control at the level of actual processing while control commands provide macroscopic control at the level of those responsible for the overall process.

7. Operation of Apparatus 101 in a Preferred Embodiment

Having thus described the components of a preferred embodiment of apparatus 101 and their relationships with each other, the description of the preferred embodiment continues with a description of the operation of apparatus 101, beginning with definition of a package type in apparatus 101 and continuing with use of apparatus 101 to process the package. In a preferred embodiment, users of apparatus 101 select package operations from a package menu.

A user who wishes to define a package type and is permitted to do so may select package type definition from the menu. Definition of a package type involves defining a prototype PTYP) 207 for components of PKGs 104 of the type and defining type environment (TENV) 353. PTYP 207 contains information which is valid for all PKGs 104 created using PTYP 207. For example, PTYP 207 for HDR 333 might contain SYSNO 339, HDRV 3411, PT 311, PTV 343, and the file type description portion of PDIR 337. The amount of information contained in PTYP 207 will vary with the degree of flexibility permitted the type. For example, if all PKGs 104 of the type always use the same RT 315, PTYP 207 may contain the complete RT 315. Defining TENV 353 involves making the materials belonging to TENV 353, and providing them to the LCs 109 processing the package.

In a preferred environment, TOOLS 208 may include tools for assuring consistency among the components of the package type. For example, the package definition editor of TOOLS 208 may first request the package definer to list the LCs 109 to which the package type will be sent, then create LCLIST 621 in a prototype of CTLREC 335 from the input, then ask the package definer to define TENV 353 and create descriptors for elements of TENV 353 in the prototype of CTLREC 335, then ask the package definer to define the records in the PDFs 301 used in the package, and then create descriptors for the records in the prototype of PREFINFO 627 of CTLREC 335.

Next, the package editor may then permit the package definer to write a prototype for RT 315. As the definer uses HREFs 608, MBREFs 610, PREFs 611 and APPREFs 614 in RT 315, the package editor checks them for consistency with the descriptors in the prototype of CTLRC 335 and HDR 333; as the definer writes CREFs 609 and VREFs 615 in RT 315, the package editor checks whether they are already specified in the prototype of CTLREC 335, and if they are not, creates specifications for them.

The package editor may further permit the package definer to define screens on UWS 213 for use by PTYPE 207 for the package type. Such screens may permit users to provide information for CTLREC 335 or HDR 333 for a PKG 104, to select among a preexisting set of files for PDFs 301, to select one of several RTs 315, or to modify a RT 315, to include copies of their own files in PDFs 301, or to input data which PPES 211 will make into a PDF 301. As screens are defined, the package editor checks their consistency with the descriptors in the prototype of CTLREC 335. When the package definition is finished, the definition editor may send the components of TENV 353 to the LCs 109 listed in the prototype LCLIST. Tools at those LCs 109 permit construction of TENV 353 from the components. In other embodiments, separate tools may perform these functions and PPES 211 may include a consistency checker which is run after all of the components of the package definition have been created to determine whether the components are consistent with each other.

A user of apparatus 101 in a preferred embodiment who wishes to create a PKG 104 selects the package creation option on the menu. The next menu presents the package creator with an index of package types. The creator selects the package type corresponding to the business process he wishes to carry out, and PPES 211 selects PTYP 207 for the type from PTL 205. Using screens defined in PTYP 207, PPES 211 collects additional information from the package creator as required for the package 104. For all packages, some information, such as an identification of the originator of the package, is required for HDR 333. As explained above, the screens may further request the creator to specify files to be copied into PDFs 301 or to provide data from which a PDF 301 can be made. As PDFs 301 are added to PKG 104, their title, type, and file name are placed in PDIR 337.

Additionally, PPES 211 may permit the creator to provide information from which PPES 211 can modify route 315. For example, the prototype of route 315 as created during package type definition may specify a default list of recipients, PPES 211 may present a screen to the creator permitting him to select recipients from the default list or add recipients to the list, and PPES 211 will then use the information to produce route 315 from a prototype thereof. In carrying out manipulations on the contents of PKG 104, PPES 211 uses programs in TOOLS 208 as required by the type of file being manipulated. Type information needed to select the proper program comes from PDIR 337.

At the end of the creation process, data 103 contains all the PDFs 301 needed to commence processing and PD 105 contains RT 315, HDR 333, and CTLREC 335 which are sufficiently complete to begin processing. The creator then indicates to PPES 211 by means of a function key or the like in UWS 213 that the PKG 104 is to be sent. PPES 211 receives PKGID 305 from DTCS 225 and places it in HDR 333 DTCS 225 makes a VREC 407 for PKG 104 in local CTLDB 401, filling in TOA field 411 and PKGKEY field 303 and sends a message to the DTCS 225 for group CTLDB 503 indicating PKG 104's PKGID 305 and location. Since there is no record in GCTLDB 503 for PKG 104, the DTCS 225 for group CTLDB 503 sends a message regarding PKG 104's existence and location to central CTLDB 505. Those DTCSs then make records for PKG 104 in those data bases. After sending the messages, the local DTCS 225 then confirms that PKG 104 has been registered and PPES 211 sends a message to PRMS 215 indicating that PKG 104 is ready. PRMS 215 performs whatever processing is specified in RT 315 for the LC 109 where PKG 104 was created, using items in TENV 353 for the package's type as required. Results of the processing are recorded in EXEC REC 351 of HDR 333 and STALIST 417 of VREC 407. Before sending PKG 104 on to the next LC 109 specified in RT 315, PRMS 215 checks with DTCS 225 for control commands for PKG 104. If there are any, PRMS 215 executes the control commands if there are none, DTCS 225 indicates that fact and PRMS 215 uses the mail system to send PKG 104 on to the mailbox specified in RT 315. PRMS 215 notifies DTCS 225 that PKG 104 has been sent and indicates the destination; thereupon, PRMS 215 destroys PKG 104 in PKGLIB 210 on that LC 109. DTCS 225 fills in TOD field 413 and DEST field 415 in VREC 407 and waits for confirmation from DTCS 225 on the next LC 109 that PKG 104 has arrived.

When PKG 104 arrives in the next LC 109, PRMS 215 in that LC 109 responds to its arrival by copying the contents of PKG 104 into PKGLIB 210 and providing PKGKEY 303 and the mailbox from which PKG 104 was sent to DTCS 225. DTCS 225 makes a VREC 407 for PKG 104, sends confirmation of its arrival to DTCS 225 at the previous LC 109, and sends a message to DTCS 225 for GCTLDB 503 to indicate which LC 109 PKG 104 is presently at. Again, if there is no previous record for PKG 104 in GCTLDB 503, that DTCS 225 sends a message to CCTLDB 505. Once these matters are taken care of, PRMS 215 sends a message to the mailbox specified in the TO statement which sent PKG 104 to LC 109. The message indicates that a PKG 104 has arrived. If the owner of the mailbox wishes to respond to the message, he invokes PPES 211, which uses the contents of PKG 104 and of TENV 353 to provide screens in the fashion described for PKG 104 creation on UWS 213 which guide the owner of the mailbox through the interactive processing which is necessary at that point.

Processing may involve manipulation of PDFs 301, addition of copies of files to PKG 104, or creation of new files therein, as determined by TENV 353 and the access privileges which the owner of the mailbox has with regard to the package contents. Actual manipulation is performed by programs in TOOLS 208 as required for the type of file in PKG 104 being worked on. Using techniques well-known in the art, the mailbox owner may provide that processing may be done in the background instead of interactively. Thereupon, the further steps specified for LC 109 in RT 315 are carried out and recorded as required in STALIST 417 of VREC 407 and AT 321. If a BACKUP statement is executed at LC 109, making a backup PKG 219, the location of PKGB 219 is indicated in PKGBLOC field 419 of VREC 407.

If editing of RT 315 is required, the owner of the mailbox may perform the editing within the bounds permitted by his access privileges and TPTYP 363 of TENV 353. Editing is done using tools of PPES 211 as described for creation of RT 315. The tools may check for consistency of the new material with CTLREC 335. Editing may range from complete access to RT 315 itself to selecting among several local RTs 617 to selecting among different lists of recipients. Alternatively, if the mailbox is a domain mailbox 803, LRT 617 may be automatically invoked upon arrival in DMB 803.

Processing continues as described above at each of the LCs 109 specified in RT 315 until all steps have been executed, until a TERMINATE statement is executed, or until a control command is received. Control commands may be issued by any user of apparatus 101 who is privileged to do so. To issue a control command, a user selects that option from apparatus 101's menu. In response to the option, PPES 211 provides menus for the control command. When the user has employed the menus to specify at least PKG 104 and the control command, PPES 211 provides the command to DTCS 225 on the local LC 109. The local DTCS 225 and the DTCSs 225 for the other portions of CTLDB 227 then cooperate as previously described to locate LC 109 currently being visited by PKG 104 and provide the control command to DTCS 225 on that LC 109. DTCS 225 places the command in CTLMESS 421 of VREC 407 for PKG 104, PRMS 215 checks with the local DTCS 225 before sending PKG 104 to the next LC 109, and if one is present, PRMS 215 executes the control command.

Using PPES 211, a user of apparatus 101 may make inquiries of DTCS 225 concerning the current status of a PKG 104. As previously explained, if PKG 104 is currently on the user's LC 109, DTCS 225 obtains the information from VREC 407 in the local CTLDB 401; otherwise, it uses CTLDB 227 to locate PKG 104 and then receives the status information from local CTLDB 401 in that LC 109. If a user receives an error message from ENRS 229, finally, the user may use PPES 211 to examine the message, determine the present status of PKG 104, examine PKG 104, and if necessary, issue the control commands required to correct the situation to DTCS 225.

8. Conclusion

The foregoing has disclosed novel apparatus for distributing processing of data among a plurality of loci of control by means of a package containing the data and a processing descriptor describing how the data is to be processed at each locus and has shown those skilled in the art how a preferred embodiment thereof may be implemented in a system of multitasking processors which are connected by a network and which have an electronic mail system permitting sending of messages between tasks on the processors.

In a preferred embodiment, the apparatus includes a package containing data files of various types and a processing descriptor and components in each locus of control including a component for creating and modifying packages, a component for executing the steps defined in the processing descriptor, a component for tracking and controlling the package, and a component for detecting errors. Other embodiments may have more or fewer components, and the components may perform more or fewer functions than those described herein. In particular, the tracking and controlling component may employ data bases arranged differently from those described herein. Additionally, other embodiments may be implemented in single tasking processors or in networks containing a combination of multi and single processing processors or in a single multi tasking system.

As regards the package, other embodiments may have different mechanisms for defining, creating, and editing packages, permit different representations of data in the package, may use different statements in the route, may contain more or fewer types of references, and may employ different techniques for resolving the references. Moreover, other embodiments may not permit users to modify the data in the package or the route. Other embodiments may also have no control commands or different control commands from those in the preferred embodiment. The preferred embodiment described herein is thus to be considered in all respects as illustrative and not restrictive, the scope of the invention being indicated by the appended claims rather than the foregoing description, and all changes which come within the meaning and range of equivalency of the claims are intended to be embraced therein.

What is claimed is:

1. In a digital data processing system having a first plurality of loci of control, apparatus for distributing the processing of data across the loci comprising:
   (1) a package including
      the data to be processed and
      a processing descriptor associated with the data which specifies a second plurality of the first plurality of loci in which the data is to be processed and how the data is to be processed in the second plurality of loci;
   (2) a message system for providing the package to the second plurality of loci; and
   (3) interpreter means in each locus of the second plurality of loci for processing the data by executing a portion of the processing descriptor specified for that locus.

2. In the apparatus for distributing the processing of data of claim 1 wherein:
   the processing descriptor further describes the order in which the loci of the second plurality of loci process the package and
   the interpreter means further responds to the processing descriptor by employing the message system to send the package as processed by the locus to the next locus in the order described in the processing descriptor.

3. In the apparatus for distributing the processing of data of claim 2 and wherein:
   the order is sequential.

4. The apparatus for distributing the processing of data of claim 3 and further including:
   means in each locus of the second plurality of loci for receiving a control command affecting execution of the processing descriptor and providing the control command to the interpreter means and wherein
   the interpreter means is responsive to the control command and executes the control command prior to sending the package to the next locus.

5. The apparatus for distributing the processing of data of claim 3 and further including:
   means in each locus for altering a portion of the processing descriptor which has not yet been executed and wherein
   the interpretation means executes the altered portion as altered.

6. In the apparatus for distributing the processing of data of claim 1 and wherein:
   at least one of the loci in the first plurality of loci includes status recording means for indicating the current status of the package as the package is being processed by the second plurality of loci and
   the interpreter means in each locus of the second plurality of loci is capable of employing the message system to send status information concerning the processing of the package to the status recording means.

7. In the apparatus for distributing the processing of data of claim 6 and wherein:
   the processing descriptor specifies that certain status information be sent to the status recording means and
   the interpreter means further sends the certain status information in connection with execution of the portion of the processing descriptor by the interpreter means.

8. In a digital data processing system having a first plurality of loci of control, apparatus for distributing the processing of data of different types across the loci comprising:
   (1) a package including
      the data and
      a data descriptor indicating the type of the data;
   (2) means for routing the package to a second plurality of the first plurality of loci according to a predetermined route; and
   (3) means in each locus of the second plurality of loci responsive to the data descriptor for processing the data received in the locus as required by the type of the data specified in the data descriptor.

9. In the apparatus for distributing the processing of data of claim 8 and wherein:

the means for routing the package and
route specifier in the package specifying which loci are to receive the package and
route interpreter means in each locus for executing the route specifier by sending the package to the next locus specified in the route specifier.

10. In the apparatus for distributing the processing of data of claim 9 and wherein:
the package is processed sequentially and the route specifier specifies the sequence in which the loci process the package.

11. The apparatus for distributing the processing of data of claim 10 and further including:
means in each locus for receiving a control command affecting execution of the route specifier and providing the control command to the route interpreter means and wherein
the route interpreter means is responsive to the control command and executes the control command prior to sending the package to the next locus.

12. The apparatus for distributing the processing of data of claim 10 and further including:
means in each locus for altering the unexecuted portion of the route specifier
and wherein
the route interpreter means executes the route specifier as altered.

13. In the apparatus for distributing the processing of data of claim 8 and wherein:
the means responsive to the data descriptor includes interactive means for processing the data.

14. In a digital data processing system having a plurality of loci of control, apparatus for distributing the processing of data across the loci comprising:
(1) a package including
the data and
a route specifier indicating a route by which the loci are to process the data;
(2) route altering means in certain of the loci for altering the portion of the route in which the loci have yet to process the data; and
(3) route interpreter means in each locus responsive to the route as altered for routing the package to the next locus on the route.

15. In the apparatus of claim 14 and wherein:
the route altering means specifies a local route defined in the locus and
the route interpreter means responds to the route altering means by routing the package to the local route before further routing the package as specified in the route specifier.

16. In the apparatus of claim 14 and wherein:
the route altering means alters the route specifier; and
the route interpreter routes the package as indicated in the altered route specifier.

17. The apparatus for distributing the processing of data of claim 14 and further including:
means in each locus for receiving a control command affecting the route and providing the control command to the route interpreter means and wherein
the route interpreter means is responsive to the control command and executes the control command prior to sending the package to the next locus on the route.

18. The apparatus for distributing the processing of data of claim 17 and further including:

control command sending means in certain of the loci for sending the control command to the locus where the package is currently located.

19. The apparatus for distributing the processing of data of claim 18 and further including:
package location means for determining the locus where the package is currently located
and wherein
the control command sending means employs the package location means to locate the package.

20. In a digital data processing system in which an item of data is processed by sending the item among a plurality of loci of control to be processed by processing means in each locus of the plurality of loci, control apparatus for controlling the processing of the item comprising:
(1) control command sending means in certain of the loci for sending a control command affecting the processing to the locus currently processing the item;
(2) control command receiving means in each of the loci for receiving the control command; and
(3) control command execution means in each of the loci for receiving the control command from the control command receiving means and executing the control command before the item is sent to the next locus.

21. The control apparatus of claim 10 and further comprising:
package location means for determining the locus where the package is currently located
and wherein
the control command sending means employs the package location means to locate the package.

22. The control apparatus of claim 21 and wherein:
the package location means includes
a first data base in each locus of the plurality of loci which contains a detailed visit record of each visit by the item to that locus,
a second data base accessible to each locus which contains a record indicating each locus which has been visited by the item, and
means is the certain loci for using the first data base to determine whether the item is in the locus to which the first data base belongs and if it is not, using the second data base to locate the item.

23. In a digital data processing system having a plurality of loci of control linked by a message system, apparatus for distributing the processing of data across the loci comprising:
a package which is sendable via the message system and which includes
the data to be processed and
a route specifier indicating a route by which the loci are to process the data;
in first certain of the loci,
route specifier editing means for altering a portion of the route specifier which specifies a portion of the route in which the loci have yet to process the data; and
in each locus of the plurality of loci,
control command receiving means for receiving a control command affecting the route via the message system and
route interpreter means for interpreting the route specifier as altered by receiving the package from the message system, providing the package to a destination in the locus specified in the route specifier, receiving the package from the destination, receiving any control command from the control command receiving means and executing the control command, and second the package via the message means to the next locus specified in the route specifier.

24. In the apparatus for distributing the processing of data of claim 23 and wherein:
the package further includes means for indicating the type of the data; and
data editing means in each locus responsive to the type indicating means for editing the data as required by the data's type.

25. The apparatus for distributing the processing of data of claim 23 and further including:
package creation means in second certain of the loci for creating the package and
package termination means in third certain of the loci for destroying the package, the package being creatable solely by the package creation means and destructible solely by the package termination means.

26. In the apparatus for distributing the processing of data of claim 25 and wherein:
the package termination means is part of the route interpreter means;
the route specifier further indicates termination of the package;
the control command is a termination command; and
the package termination means destroys the package in response to either the route specifier or the control command.

27. In the apparatus for distributing the processing of data of claim 23 and wherein:
the apparatus includes a domain made up of a set of the loci, at least one of the set of loci being one of the first certain loci.

28. In the apparatus for distributing the processing of data of claim 27 and wherein:
the route editing means in the locus of the first certain loci in the domain adds a local route specifier indicating the sequence of processing in the domain to the route specifier.

29. In the apparatus for distributing the processing of data of claim 28 and wherein:
the package includes a package type specifier specifying the type of the package;
there is a predetermined local route specifier corresponding to the package type; and
the route editing means is responsive to the package type specifier and adds the local route specifier corresponding to the specified package type to the route specifier.

30. In the apparatus for distributing the processing of data of claim 28 and wherein:
the route interpreter means in the first certain locus invokes the local route specifier.

31. In the apparatus for distributing the processing of data of claim 23 and wherein:
the route specifier further specifies processing in the loci; and
the route interpreter means in each locus performs the processing specified for that locus.

32. The apparatus for distributing the processing of data of claim 23 and further comprising: in second certain of the loci,
a package record indicating the loci in which the package has been processed and
package record management means for updating the package record for the package in response to update messages and providing information from the package record in response to status messages, in each locus of the plurality of loci,
package visit recording means for recording the visit of the package to the locus and the status of the processing in the locus and sending a message updating the package record and
package status obtaining means for sending a status message to the package record management means, using the information provided in response thereto to locate the locus at which the package was most recently processed and obtaining the status from the package visit recording means at that locus.

33. In the apparatus for distributing the processing of data of claim 23 and wherein:
the route specifier further includes route execution state; and
the route interpreter means interprets the route specifier as determined by the route execution state.

34. In the apparatus for distributing the processing of data of claim 23 and wherein:
the route specifier further indicates that a backup of the package is to be made at a given one of the loci; and
the route interpreter means in the given one of the loci responds to the route specifier by making and storing a copy of the package.

35. In the apparatus for distributing the processing of data of claim 23 and wherein:
the route specifier further indicates that the package is to be split at a given one of the loci; and
the route interpreter means in the given one of the loci responds to the route specifier by producing a copy of the package and processing the original and the copy independently from each other.

* * * * *

UNITED STATES PATENT AND TRADEMARK OFFICE
CERTIFICATE OF CORRECTION

PATENT NO. : 4,932,026

DATED : June 5, 1990

INVENTOR(S) : Roger H. Dev, Gabriel Steinberg, John B. Kam and Stewart A. Comer

It is certified that error appears in the above-identified patent and that said Letters Patent is hereby corrected as shown below:

Column 2, line 68, delete "cop" and insert ---copy---.

In Claim 9, column 25, line 1, delete the last word "and" and insert ---includes---. Column 25, line 2, before the first word "route", insert ---a---.

Column 26, line 28, (Claim 21, the first line of that claim), delete "Claim 10" and insert ---Claim 20---.

Column 26, line 43, (Claim 22, line 9 of that claim), delete "is" and insert ---in---.

Claim 23, column 27, line 4, delete "second" and insert ---sending---.

Signed and Sealed this

Eleventh Day of February, 1992

Attest:

HARRY F. MANBECK, JR.

*Attesting Officer*     *Commissioner of Patents and Trademarks*